US012724112B2

(12) United States Patent
He et al.

(10) Patent No.: US 12,724,112 B2
(45) Date of Patent: Sep. 1, 2026

(54) COMMUNICATION METHOD AND COMMUNICATION APPARATUS

(71) Applicant: HUAWEI TECHNOLOGIES CO., LTD., Shenzhen (CN)

(72) Inventors: Jia He, Chengdu (CN); Xianfeng Du, Chengdu (CN); Guangjian Wang, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 701 days.

(21) Appl. No.: 18/154,587

(22) Filed: Jan. 13, 2023

(65) Prior Publication Data

US 2023/0152422 A1 May 18, 2023

Related U.S. Application Data

(63) Continuation of application No. PCT/CN2021/104485, filed on Jul. 5, 2021.

(30) Foreign Application Priority Data

Jul. 15, 2020 (CN) ......................... 202010682279.1

(51) Int. Cl.
*G01S 7/285* (2006.01)
*G01S 7/00* (2006.01)

(52) U.S. Cl.
CPC .............. *G01S 7/285* (2013.01); *G01S 7/006* (2013.01)

(58) Field of Classification Search
CPC ........ G01S 7/285; G01S 7/006; G01S 13/343; G01S 13/931; G01S 2013/9316;
(Continued)

(56) References Cited

U.S. PATENT DOCUMENTS

2018/0031673 A1 2/2018 Kim et al.
2020/0212956 A1* 7/2020 Gollakota ................ H04B 1/40
2020/0229102 A1* 7/2020 Gubeskys ........... H04W 52/146
2022/0171055 A1* 6/2022 Song ....................... G01S 7/021
2022/0175254 A1* 6/2022 Hui ......................... G01S 13/88
(Continued)

FOREIGN PATENT DOCUMENTS

CN 203825192 U 9/2014
JP 2020043390 A * 3/2020

OTHER PUBLICATIONS

IEEE 802.11n-2009, "IEEE Standard for Information technology—Local and metropolitan area networks—Specific requirements: Part 11: Wireless LAN Medium Access Control (MAC)and Physical Layer (PHY) Specifications; Amendment 5: Enhancements for Higher Throughput," Oct. 30, 2009, 536 pages.
(Continued)

*Primary Examiner* — William Kelleher
*Assistant Examiner* — Ismaaeel A. Siddiquee
(74) *Attorney, Agent, or Firm* — Fish & Richardson P.C.

(57) ABSTRACT

Embodiments of this application disclose a communication method and an apparatus thereof, to implement data communication between a first communication apparatus and a second communication apparatus, so that spectrum resource utilization can be improved. The method in embodiments of this application includes: The first communication apparatus determines a first sensing signal and a second sensing signal; and the first communication apparatus determines a third sensing signal, where the third sensing signal is obtained based on a first data signal and the first sensing signal, the first data signal is a data signal to be sent by the first communication apparatus to the second communication apparatus, and a first frequency difference between a frequency of the second sensing signal and a frequency of the third sensing signal is a preset threshold; and the first communication apparatus sends the second sensing signal and the third sensing signal.

11 Claims, 13 Drawing Sheets

(58) Field of Classification Search
CPC ........ G01S 7/0235; G01S 7/003; H04W 4/40; H04W 74/0808; H04W 24/02; H04W 72/0453; H04L 69/18
See application file for complete search history.

(56) References Cited

U.S. PATENT DOCUMENTS

2023/0086144 A1* 3/2023 Roy ........................ G01S 7/006 370/329

OTHER PUBLICATIONS

Kim et al., "Random phase code for automotive MIMO radars using combined frequency shift keying-linear FMCW waveform," IET Radar Sonar Navigation, vol. 12, No. 10, Oct. 1, 2018, pp. 1090-1095.
IEEE 802.11ad-2012, "IEEE Standard for Information technology—Telecommunications and information exchange between systems; Local and metropolitan area networks; Specific requirements; Part 11: Wireless LAN Medium Access Control (MAC) and Physical Layer (PHY) Specifications; Amendment 3: Enhancements for Very High Throughput in the 60 GHz Band," Dec. 28, 2012, 628 pages.
Barrenechea et al. "FMCW radar with broadband communication capability," Proceedings of the 4th European Radar Conference, Oct. 1, 2007, pp. 130-133.
International Search Report and Written Opinion in International Appln. No. PCT/CN2021/104485, mailed on Aug. 30, 2021, 17 pages (with English translation).
Partial Supplementary European Search Report in European AppIn No. 21842149.3, dated Nov. 7, 2023, 14 pages.

* cited by examiner

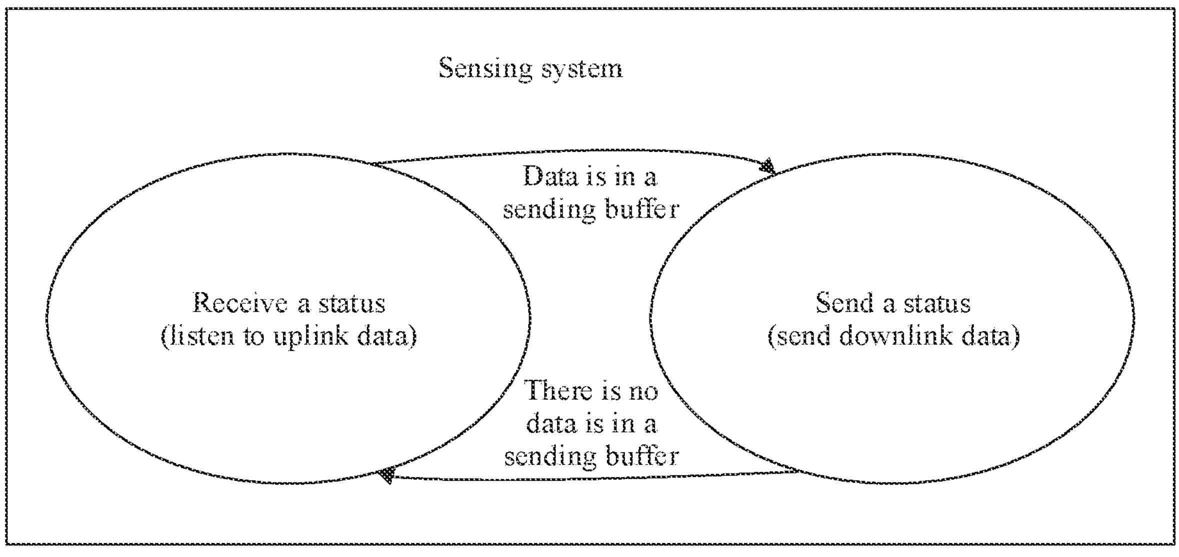

FIG. 1C

First communication apparatus

Second communication apparatus

201: Determine a first sensing signal and a second sensing signal

202: Determine a third sensing signal, where the third sensing signal is obtained based on first data signal and the first sensing signal 203: Send the second sensing signal and the third sensing signal 204: Receive the second sensing signal and the third sensing signal

FIG. 2

COMMUNICATION METHOD AND COMMUNICATION APPARATUS

CROSS-REFERENCE TO RELATED APPLICATIONS

This application is a continuation of International Application No. PCT/CN2021/104485, filed on Jul. 5, 2021, which claims priority to Chinese Patent Application No. 202010682279.1, filed on Jul. 15, 2020. The disclosures of the aforementioned applications are hereby incorporated by reference in their entireties.

TECHNICAL FIELD

This application relates to the field of communication technologies, and in particular, to a communication method and a communication apparatus.

BACKGROUND

To obtain a high-precision sense effect, radar signals occupy a large quantity of spectrum resources. However, the large quantity of spectrum resources are merely used for sensing, and this causes a waste of the resources. Therefore, a solution of a fusion design of sense and communication is proposed to improve utilization of spectrum resources.

Currently, a vehicle-mounted device modulates a data signal to a radar signal, so that the vehicle-mounted device can be used to measure a distance, and can also complete data communication between vehicle-mounted devices on different vehicles.

However, in the foregoing solution, a sending device and a receiving device need to support a same bandwidth and have a same signal processing capability, that is, both a transmit end and a receive end should be able to send or receive a broadband signal. In an actual scenario, more communication devices are narrowband devices, and a narrowband device cannot receive a broadband signal. Consequently, data communication cannot be implemented between a radar device and a narrowband device.

SUMMARY

Embodiments of this application provide a communication method and a communication apparatus, for implementing data communication between a first communication apparatus and a second communication apparatus, to improve utilization of spectrum resources.

A first aspect of embodiments of this application provides a communication method. The method includes:

A first communication apparatus determines a first sensing signal and a second sensing signal; then, the first communication apparatus determines a third sensing signal, where the third sensing signal is obtained based on a first data signal and the first sensing signal, the first data signal is a data signal to be sent by the first communication apparatus to a second communication apparatus, and a first frequency difference between a frequency of the second sensing signal and a frequency of the third sensing signal is a preset threshold; and the first communication apparatus sends the second sensing signal and the third sensing signal.

In this embodiment, the first communication apparatus modulates the first data signal onto the third sensing signal, and the first frequency difference between the frequency of the second sensing signal and the frequency of the third sensing signal is the preset threshold. In this way, when the second sensing signal and the third sensing signal pass through a non-linear circuit of the second communication apparatus, a first harmonic signal is generated. The second communication apparatus obtains, by using the first harmonic signal, the first data signal carried in the first harmonic signal, thereby implementing data communication between the first communication apparatus and the second communication apparatus without affecting sensing an ambient environment by the first communication apparatus, to improve utilization of spectrum resources. That is, according to the technical solution in this embodiment of this application, data communication between a radar device and a narrowband device can be implemented.

In a possible implementation, that the first communication apparatus sends the second sensing signal and the third sensing signal includes: The first communication apparatus sends the second sensing signal by using a first antenna, and sends the third sensing signal by using a second antenna.

In this possible implementation, the first communication apparatus separately sends the second sensing signal and the third sensing signal by using different antennas. In addition, the third sensing signal is obtained by the first communication apparatus by performing modulation based on the first data signal and the first sensing signal. In this way, by sending the second sensing signal and the third sensing signal, the first communication apparatus can sense the ambient environment by using the second sensing signal and can transmit the first data signal by using the third sensing signal.

In another possible implementation, the first sensing signal is $s_1(t)=A_1e^{2\pi f_1(t)t}$, the second sensing signal is $s_2(t)=A_2e^{2\pi f_2(t)t}$, and the third sensing signal is $$s_1(t) = s_D(t)A_1e^{2\pi f_1(t)t},$$

$$\text{where } f_1(t) = \begin{cases} R\cdot t + \frac{BW}{2}, t < \frac{T}{2} \\ R\cdot t - \frac{BW}{2}, \frac{T}{2} < t < T \end{cases}, f_2(t) = R\cdot t, s_D(t)$$

is the first data signal, R is a frequency change rate of the second sensing signal or a frequency change rate of the third sensing signal, BW is a bandwidth of the third sensing signal, T is a signal period of $f_1(t)$, the preset threshold is $|f_1(t)-f_2(t)|$, $|x|$ refers to taking an absolute value of x, $A_1$ is greater than 0, $A_2$ is greater than 0, $A_1$ is an amplitude of the first sensing signal, and $A_2$ is an amplitude of the second sensing signal.

In this possible implementation, when t is between 0 and T/2, $f_1(t)-f_2(t)=BW/2$; and when t is between T/2 and T, $f_2(t)-f_1(t)=BW/2$. It can be learned from this that a difference between $f_1(t)$ and $f_2(t)$ is a fixed value. It can be learned from this that $f_1(t)$ and $f_2(t)$ are still linear sweep signals. Because a resolution sensed by the first communication apparatus is directly proportional to a bandwidth of the sensing signal, a wider bandwidth indicates a higher resolution. A sweep bandwidth is a maximum bandwidth supported by the first communication apparatus, that is, the bandwidth of the sensing signal remains unchanged. In this embodiment, the data communication between the first communication apparatus and the second communication apparatus is implemented without affecting sensing precision.

In another possible implementation, the second communication apparatus is a first-type communication apparatus, and the method further includes: The first communication apparatus sends a first control signal, where the first control signal is used to indicate a third communication apparatus not to receive a data signal in a first time period, and the third communication apparatus is a second-type communication apparatus; and the first communication apparatus sends a second control signal to the second communication apparatus, where the second control signal is used to indicate the second communication apparatus to receive the first data signal in the first time period.

In this possible implementation, in a communication system, different types of communication apparatuses support different protocols. For the communication apparatuses supporting the different protocols, one communication apparatus cannot learn about a data transmission status of another communication apparatus. The first communication apparatus schedules the communication apparatuses supporting different types to receive data signals in different time periods, to avoid signal interference.

A second aspect of embodiments of this application provides a communication method. The method includes:

A second communication apparatus receives a second sensing signal and a third sensing signal, where the third sensing signal is obtained based on a first data signal and a first sensing signal, and the first data signal is a data signal sent by the first communication apparatus to the second communication apparatus.

In this implementation, the second communication apparatus receives the second sensing signal and the third sensing signal that are sent by the first communication apparatus, to obtain the first data signal carried in the third sensing signal, thereby implementing data communication between the first communication apparatus and the second communication apparatus without affecting sensing an ambient environment by the first communication apparatus, to improve utilization of spectrum resources. That is, according to the technical solution in this embodiment of this application, data communication between a radar device and a narrowband device can be implemented.

In a possible implementation, when the second sensing signal and the third sensing signal pass through a non-linear circuit of the second communication apparatus, a first harmonic signal is generated, and the first harmonic signal carries the first data signal.

In this possible implementation, the second communication apparatus obtains the first data signal by using the first harmonic signal generated when the second sensing signal and the third sensing signal pass through the non-linear circuit, to implement data communication between the first communication apparatus and the second communication apparatus, thereby improving utilization of spectrum resources.

In another possible implementation, the first harmonic signal is M times of a first frequency difference, and the first frequency difference is a frequency difference between a frequency of the second sensing signal and a frequency of the third sensing signal, where M is an integer greater than or equal to 1.

In this possible implementation, the first harmonic signal is a narrowband signal, so that the narrowband device can demodulate the first harmonic signal to obtain the first data signal, thereby implementing data communication between the radar device and the narrowband device.

In another possible implementation, the second communication apparatus is a first-type communication apparatus, and the method further includes:

The second communication apparatus receives a second control signal sent by the first communication apparatus. The second communication apparatus determines, based on the second control signal, to receive the first data signal in a first time period.

In this possible implementation, in a communication system, different types of communication apparatuses support different protocols. For the communication apparatuses supporting the different protocols, one communication apparatus cannot learn about a data transmission status of another communication apparatus. The first communication apparatus schedules the communication apparatuses supporting different types to receive data signals in different time periods. When downlink communication between the first communication apparatus and the second communication apparatus is performed, mutual interference of signals can be avoided, and reasonable coexistence is implemented. In addition, the first communication apparatus communicates with the communication apparatuses supporting the different protocols, becomes a gateway in a smart home, and coordinates the communication apparatuses of the different protocols.

A third aspect of embodiments of this application provides a communication method. The method includes:

The first communication apparatus receives a first reflected signal and a second data signal, where the first reflected signal is a reflected signal corresponding to a fourth sensing signal, and the second data signal is a data signal sent by a second communication apparatus to the first communication apparatus; then, the first communication apparatus determines a first signal, where the first signal is obtained based on the first reflected signal and the fourth sensing signal; the first communication apparatus mixes the second data signal with a second signal to obtain a third data signal, where the third data signal occupies a first frequency band, the first signal occupies a second frequency band, the first frequency band does not cross the second frequency band, and one of the first frequency band and the second frequency band includes a baseband frequency; the first communication apparatus performs sensing and measurement by using the first signal to obtain a sensing result; and the first communication apparatus demodulates the third data signal to obtain a demodulation result.

In this embodiment, the first communication apparatus staggers the frequency band occupied by the data signal sent by the second communication apparatus and the frequency band occupied by the sensing signal, so that the first communication apparatus separately processes the data signal and the sensing signal. In this way, the sensing signal and the data signal do not interfere with each other and affect each other.

In a possible implementation, that the first communication apparatus determines a first signal includes: The first communication apparatus correlates the first reflected signal with the fourth sensing signal to obtain the first signal, where the second frequency band occupied by the first signal includes the baseband frequency.

In this possible implementation, a specific manner in which the first communication apparatus determines the first signal is provided, and the second frequency band occupied by the first signal includes the baseband frequency.

In another possible implementation, a center frequency of the first frequency band is greater than a first value, the first value is a sum of half a bandwidth of the second data signal and a maximum value of a second frequency difference, and the second frequency difference is a difference between a frequency of the fourth sensing signal and a frequency of the first reflected signal.

In this possible implementation, a value range of the center frequency of the first frequency band is provided when the first frequency band does not cross the second frequency band and the second frequency band includes the baseband frequency.

In another possible implementation, the second data signal is $A_3 s_{data}(t)\sin f_L t$, the second signal is $A_4 \sin f_{LO} t$, the third data signal is $$s_{data}^{IF}(t) = [A_3 s_{data}(t)\sin f_L t] \otimes A_4 \sin f_{LO} t = A_3 A_4 s_{data}(t)\sin(f_L - f_{LO})t,$$

and a frequency of the third data signal is $f_L - L_{LO} > \Delta f_{max} + B/2$, where $\Delta f_{max}$ is the maximum value of the second frequency difference, B is the bandwidth of the second data signal, $\otimes$ refers to a frequency mixing operation, $A_3$ is greater than 0, $A_4$ is greater than 0, $A_3$ is an amplitude of the second data signal, and $A_4$ is an amplitude of the second signal.

In this possible implementation, a specific representation form of the third data signal is provided, to improve implementability of the solution.

In another possible implementation, that the first communication apparatus determines a first signal includes: The first communication apparatus correlates the first reflected signal with the fourth sensing signal to obtain a third signal; and the first communication apparatus mixes the third signal with a fourth signal to obtain the first signal, where a center frequency of the second frequency band occupied by the first signal is greater than half the bandwidth of the second data signal.

In this possible implementation, another specific manner in which the first communication apparatus determines the first signal is provided, and the second frequency band occupied by the first signal is greater than half the bandwidth of the second data signal, that is, the second frequency band does not include the baseband frequency.

A fourth aspect of embodiments of this application provides a first communication apparatus. The first communication apparatus includes:

a processing module, configured to: determine a first sensing signal and a second sensing signal; and determine a third sensing signal, where the third sensing signal is obtained based on a first data signal and the first sensing signal, the first data signal is a data signal to be sent by the first communication apparatus to a second communication apparatus, and a first frequency difference between a frequency of the second sensing signal and a frequency of the third sensing signal is a preset threshold; and a transceiver module, configured to send the second sensing signal and the third sensing signal.

In a possible implementation, the transceiver module is specifically configured to:

send the second sensing signal by using a first antenna, and send the third sensing signal by using a second antenna.

In another possible implementation, the first sensing signal is $s_1(t)=A_1 e^{2\pi f_1(t) t}$, the second sensing signal is $s_2(t)=A_2 e^{2\pi f_2(t) t}$, and the third sensing signal is $$s_1(t) = s_D(t) A_1 e^{2\pi f_1(t) t},$$

$$\text{where } f_1(t) = \begin{cases} R\cdot t + \frac{BW}{2}, & t < \frac{T}{2} \\ R\cdot t - \frac{BW}{2}, & \frac{T}{2} < t < T \end{cases}, \quad f_2(t) = R\cdot t, \; s_D(t)$$

is the first data signal, R is a frequency change rate of the second sensing signal or a frequency change rate of the third sensing signal, BW is a bandwidth of the third sensing signal, T is a signal period of $f_1(t)$, the preset threshold is $|f_1(t)-f_2(t)|$, $|x|$ refers to taking an absolute value of x, $A_1$ is greater than 0, $A_2$ is greater than 0, $A_1$ is an amplitude of the first sensing signal, and $A_2$ is an amplitude of the second sensing signal.

In another possible implementation, the second communication apparatus is a first-type communication apparatus. The transceiver module is further configured to:

send a first control signal, where the first control signal is used to indicate a third communication apparatus not to receive a data signal in a first time period, and the third communication apparatus is a second-type communication apparatus; and send a second control signal to the second communication apparatus, where the second control signal is used to indicate the second communication apparatus to receive the first data signal in the first time period.

A fifth aspect of embodiments of this application provides a second communication apparatus. The second communication apparatus includes:

a transceiver module, configured to receive a second sensing signal and a third sensing signal, where the third sensing signal is obtained based on a first data signal and a first sensing signal, and the first data signal is a data signal sent by the first communication apparatus to the second communication apparatus.

In a possible implementation, when the second sensing signal and the third sensing signal pass through a non-linear circuit of the second communication apparatus, a first harmonic signal is generated, and the first harmonic signal carries the first data signal.

In another possible implementation, the first harmonic signal is M times of a first frequency difference, and the first frequency difference is a frequency difference between a frequency of the second sensing signal and a frequency of the third sensing signal, where M is an integer greater than or equal to 1.

In another possible implementation, the second communication apparatus is a first-type communication apparatus. The transceiver module is further configured to:

receive a second control signal sent by the first communication apparatus. The second communication apparatus further includes a processing module.

The processing module is configured to determine, based on the second control signal, to receive the first data signal in a first time period.

A sixth aspect of embodiments of this application provides a first communication apparatus. The first communication apparatus includes:

a transceiver module, configured to receive a first reflected signal and a second data signal, where the first reflected signal is a reflected signal corresponding to a fourth sensing signal, and the second data signal is a data signal sent by a second communication apparatus to the first communication apparatus; and a processing module, configured to: determine a first signal, where the first signal is obtained based on the first reflected signal and the fourth sensing signal; mix the second data signal with a second signal to obtain a third data signal, where the third data signal occupies a first frequency band, the first signal occupies a second frequency band, the first frequency band does not cross the second frequency band, and one of the first frequency band and the second frequency band includes a baseband frequency; perform sensing and measurement by using the first signal to obtain a sensing result; and demodulate the third data signal to obtain a demodulation result.

In a possible implementation, the processing module is specifically configured to:

correlate the first reflected signal with the fourth sensing signal to obtain the first signal, where the second frequency band occupied by the first signal includes the baseband frequency.

In another possible implementation, a center frequency of the first frequency band is greater than a first value, the first value is a sum of half a bandwidth of the second data signal and a maximum value of a second frequency difference, and the second frequency difference is a difference between a frequency of the fourth sensing signal and a frequency of the first reflected signal.

In another possible implementation, the second data signal is $A_3 s_{data}(t) \sin f_L t$, the second signal is $A_4 \sin f_{LO} t$, the third data signal is $$s_{data}^{IF}(t) = [A_3 s_{data}(t)\sin f_L t] \otimes A_4 \sin f_{LO} t = A_3 A_4 s_{data}(t)\sin(f_L - f_{LO})t,$$

and a frequency of the third data signal is $f_L - f_{LO} > \Delta f_{max} + B/2$, where $\Delta f_{max}$ is the maximum value of the second frequency difference, B is the bandwidth of the second data signal, $\otimes$ refers to a frequency mixing operation, $A_3$ is greater than 0, $A_4$ is greater than 0, $A_3$ is an amplitude of the second data signal, and $A_4$ is an amplitude of the second signal.

In another possible implementation, the processing module is specifically configured to:

correlate the first reflected signal with the fourth sensing signal to obtain a third signal; and mix the third signal with a fourth signal to obtain the first signal, where a center frequency of the second frequency band occupied by the first signal is greater than half the bandwidth of the second data signal.

A seventh aspect of embodiments of this application provides a first communication apparatus, where the first communication apparatus includes a processor and a memory. The memory stores a computer program. The processor is configured to invoke and run the computer program stored in the memory, so that the processor implements any one of the first aspect and the implementations thereof.

Optionally, the first communication apparatus further includes a transceiver. The processor is further configured to control the transceiver to receive and send signals.

An eighth aspect of embodiments of this application provides a second communication apparatus. The second communication apparatus includes a processor and a memory, and the memory stores a computer program. The processor is configured to invoke and run the computer program stored in the memory, so that the processor implements any one of the second aspect and the implementations thereof.

Optionally, the second communication apparatus further includes a transceiver. The processor is further configured to control the transceiver to receive and send signals.

A ninth aspect of embodiments of this application provides a first communication apparatus. The first communication apparatus includes a processor and a memory, and the memory stores a computer program. The processor is configured to invoke and run the computer program stored in the memory, so that the processor implements any one of the third aspect and the implementations thereof.

Optionally, the first communication apparatus further includes a transceiver. The processor is further configured to control the transceiver to receive and send signals.

A tenth aspect of embodiments of this application provides a computer program product including instructions. When the computer program product runs on a computer, the computer is enabled to perform any one of the first aspect to the third aspect and the implementations thereof.

An eleventh aspect of embodiments of this application provides a computer-readable storage medium, including computer instructions. When the computer instructions are run on a computer, the computer is enabled to perform any one of the first aspect to the third aspect and the implementations thereof.

A twelfth aspect of embodiments of this application provides a chip apparatus, including a processor. The processor is configured to connect to a memory, and invoke a program stored in the memory, so that the processor performs any one of the first aspect to the third aspect and the implementations thereof.

A thirteenth aspect of embodiments of this application provides a communication system. The communication system includes the first communication apparatus according to the fourth aspect and the second communication apparatus according to the fifth aspect.

It can be learned from the foregoing technical solutions that embodiments of this application have the following advantages.

It can be learned from the foregoing technical solutions that the first communication apparatus determines the first sensing signal and the second sensing signal. Then, the first communication apparatus determines the third sensing signal, where the third sensing signal is obtained based on the first data signal and the first sensing signal, the first data signal is the data signal to be sent by the first communication apparatus to the second communication apparatus, and the first frequency difference between the frequency of the second sensing signal and the frequency of the third sensing signal is the preset threshold. The first communication apparatus sends the second sensing signal and the third sensing signal. It can be learned from this that the first communication apparatus modulates the first data signal onto the third sensing signal, and the first frequency difference between the frequency of the second sensing signal and the frequency of the third sensing signal is the preset threshold. In this way, when the second sensing signal and the third sensing signal pass through the non-linear circuit of the second communication apparatus, the first harmonic signal is generated. The second communication apparatus obtains, by using the first harmonic signal, the first data signal carried in the first harmonic signal, thereby implementing the data communication between the first communication apparatus and the second communication apparatus, to improve utilization of the spectrum resources. That is, according to the technical solutions in embodiments of this application, the data communication between the radar device and the narrowband device can be implemented.

BRIEF DESCRIPTION OF DRAWINGS

FIG. 1C is a schematic diagram of a sensing system according to an embodiment of this application;

FIG. 2 is a schematic diagram of an embodiment of a communication method according to an embodiment of this application;

DESCRIPTION OF EMBODIMENTS

Figures 1A, 1B:
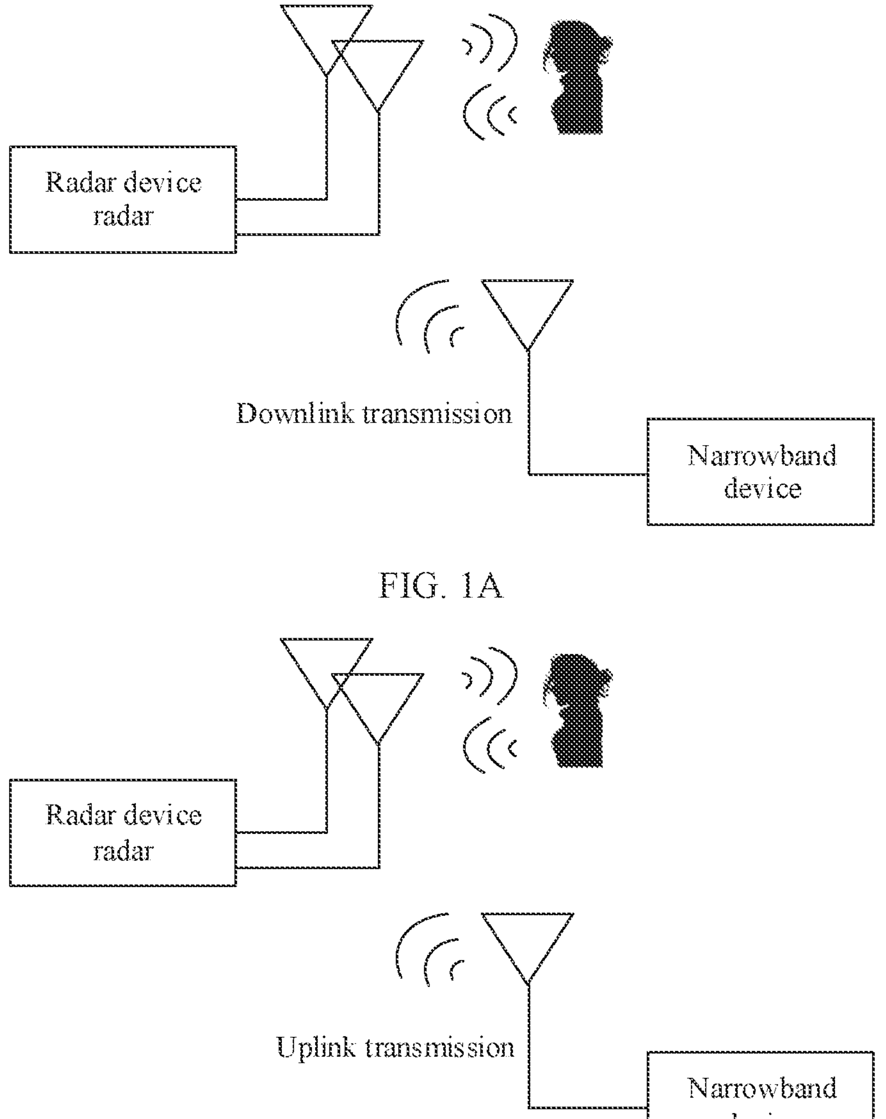
FIG. 1A is a schematic diagram of downlink transmission between a radar device and a narrowband device according to an embodiment of this application.
FIG. 1B is a schematic diagram of uplink transmission between a radar device and a narrowband device according to an embodiment of this application.

Embodiments of this application provide a communication method and a communication apparatus, for implementing data communication between a first communication apparatus and a second communication apparatus, to improve utilization of spectrum resources.

A communication system to which embodiments of this application are applicable includes, but is not limited to, a long term evolution (LTE) system, a fifth-generation (5G) mobile communication system, a mobile communication system (for example, a 6G mobile communication system) after a 5G network, a device to device (D2D) communication system, or a vehicle to everything (V2X) communication system.

In embodiments of this application, the communication system includes the first communication apparatus and the second communication apparatus. The first communication apparatus is a communication apparatus that has both a sensing capability and a communication capability. While sensing an ambient environment, the first communication apparatus sends a data signal to an ambient narrowband device by using a sensing signal, and can also receive a data signal sent by the ambient narrowband device. That is, the sensing signal and the data signal occupy a same spectrum resource, to implement sensing of the ambient environment and data communication between the first communication apparatus and the narrowband device, thereby improving spectrum utilization. The second communication apparatus is a narrowband device, and the narrowband device supports a narrow bandwidth, and can receive a narrowband data signal and receive a narrowband data signal. Optionally, the first communication apparatus is a radar device, a vehicle-mounted device, a network device, or the like, and the second communication apparatus is a terminal device.

The network device is an apparatus that is deployed in a radio access network to provide a wireless communication function for the terminal device. The network device may be a base station, and the base station includes various types of macro base stations, micro base stations, relay stations, and access networks. For example, in embodiments of this application, the base station may be a base station, a transmission reception point (TRP) or transmission point (TP), or a next-generation NodeB (ngNB) in new radio (NR), or may be an evolutional NodeB (or eNodeB) in a long term evolution (LTE) system.

The terminal device may be referred to as user equipment (UE), an access terminal, a user unit, a user station, a mobile station (MS), a mobile station, a remote terminal, a mobile device, a user terminal, a terminal, a wireless communication device, a user apparatus, or the like. The terminal device may be a cellular phone, a smartphone, a wireless data card, a personal digital assistant (PDA for short) computer, a tablet computer, a wireless modem, a laptop computer, machine type communication (MTC), any handset with a wireless communication function, a computer device, a vehicle-mounted device, a wearable device, a computing device, another processing device connected to a wireless modem, a terminal device in a 5G communication system, a terminal device in an NR system, or a terminal device in a communication system after a 5G network, for example, a terminal device in a future evolved public land mobile network (PLMN).

The following describes two possible application scenarios in embodiments of this application by using an example in which the first communication apparatus is the radar device and the second communication apparatus is the narrowband device.

FIG. 1A is a schematic diagram of downlink transmission between a radar device and a narrowband device according to an embodiment of this application. In FIG. 1A, the radar device serves as a transmit end of downlink data. When the radar device has to-be-sent downlink data, the radar device modulates the downlink data onto one of sensing signals. Then, the radar device separately sends at least two sensing signals. The narrowband device receives the at least two sensing signals sent by the radar device. When the at least two sensing signals pass through a non-linear circuit of the narrowband device, a harmonic signal is generated. The narrowband device demodulates the harmonic signal to obtain the downlink data.

FIG. 1B is a schematic diagram of uplink transmission between the radar device and the narrowband device according to this embodiment of this application. In FIG. 1B, the radar device serves as a receive end of uplink data, and the radar device receives a reflected signal and the uplink data sent by the narrowband device, where the reflected signal is a reflected signal of the sensing signal sent by the radar device.

It can be learned from this that, in this embodiment of this application, the radar device is a radar device that has both a sensing capability and a communication capability. FIG. 1C shows a sensing system of a radar device. When receiving a status, the radar device listens to the uplink data of the narrowband device, and further receives a reflected signal reflected by an ambient object to sense and measure the ambient object. When the radar device sends the status, the radar device modulates the downlink data onto the sensing signal, and sends the sensing signal to the narrowband device. It can be learned from this that the radar device has both a sensing capability and a communication capability, so the radar device implements sensing and measurement of the ambient environment, and implements data communication between the radar device and the narrowband device, so that utilization of spectrum resources is improved.

FIG. 1A to FIG. 1C are shown application scenarios which are merely used to describe technical solutions of embodiments of this application. The technical solutions of embodiments of this application are further applicable to another application scenario, for example, in the V2X communication system, data communication between two vehicle-mounted devices, and sensing and measurement of an ambient environment by the vehicle-mounted device. This is not specifically limited in this application.

The following describes the technical solutions of embodiments of this application with reference to the embodiments.

FIG. 2 is a schematic diagram of an embodiment of a communication method according to an embodiment of this application. In FIG. 2, the method includes the following steps.

201: A first communication apparatus determines a first sensing signal and a second sensing signal.

A first frequency difference between the first sensing signal and the second sensing signal is a preset threshold.

Optionally, the preset threshold is between 0 and 2 GB. Preferably, the preset threshold is 1 GB, 2 GB, 200 MHz (hertz), or the like. It should be noted that setting of the preset threshold is related to hardware implementability of the first communication apparatus, for example, related to spur and harmonic leakage that are generated when the first communication apparatus performs frequency multiplication processing on a fundamental frequency signal.

Figure 3A:
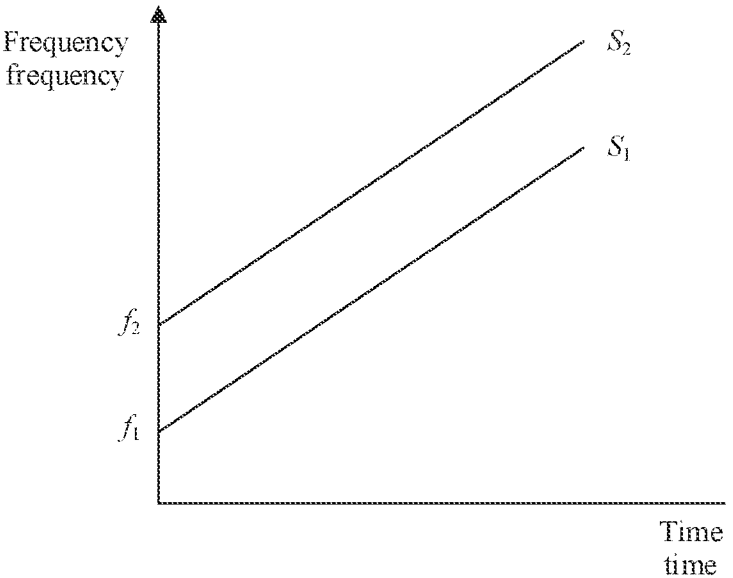
FIG. 3A is a schematic diagram of functions of a first sensing signal and a second sensing signal according to an embodiment of this application.
Figure 3B:
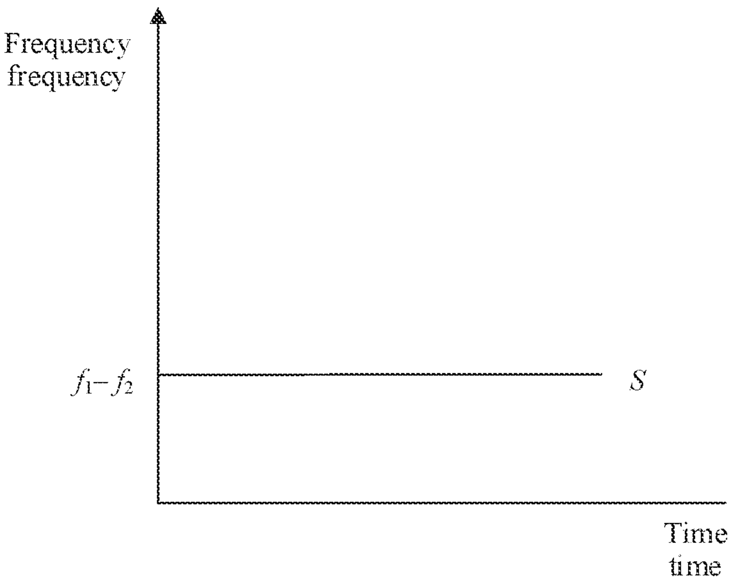
FIG. 3B is a schematic diagram of a function of a first harmonic signal according to an embodiment of this application.

Example 1: As shown in FIG. 3A, the first sensing signal is $S_1=\sin f_1(t)t$, and the second sensing signal is $S_2=\sin f_2(t)t$. It can be learned that a frequency of the first sensing signal is $f_1(t)$, and a frequency of the second sensing signal is $f_2(t)$. It can be learned from FIG. 3A that a frequency difference between the first sensing signal and the second sensing signal is a preset threshold, and the preset threshold is a fixed value. Therefore, as shown in FIG. 3B, the first frequency difference between the first sensing signal and the second sensing signal is $S=f_2(t)-f_1(t)$. That is, the preset threshold is $|f_1(t)-f_2(t)|$, and $|x|$ refers to taking an absolute value of x.

Example 2: The first sensing signal is $s_1(t)=A_1 e^{2\pi f_1(t)t}$, and the second sensing signal is $s_2(t)=A_2e^{2\pi f_2(t)t}$.

Figure 3C:
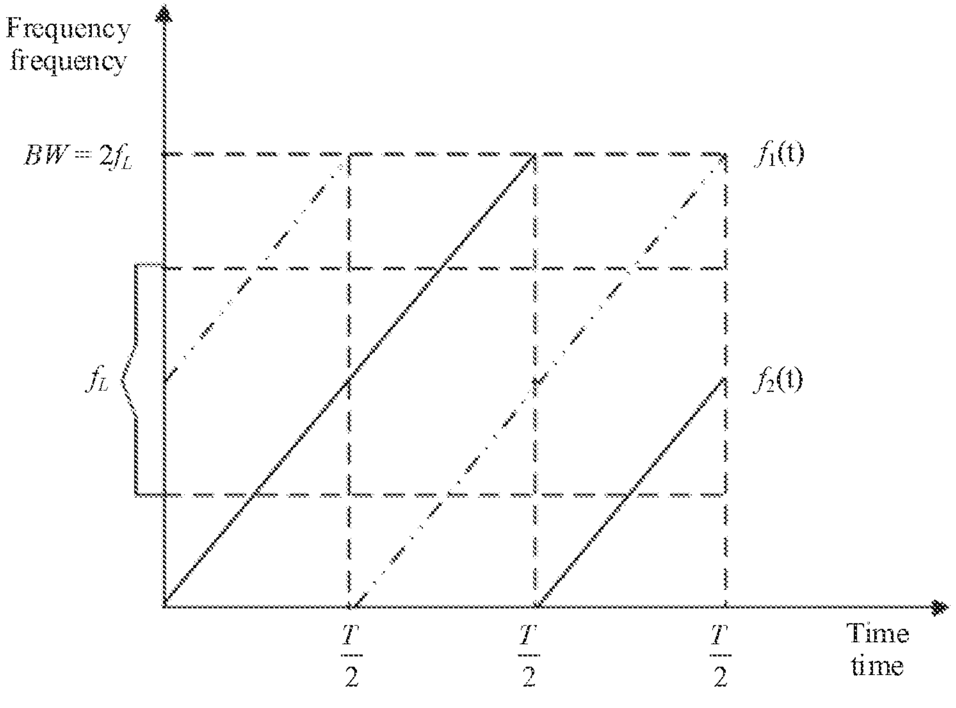
FIG. 3C is a schematic diagram of a scenario of a communication method according to an embodiment of this application.

As shown in FIG. 3C, $$f_1(t)=\begin{cases} R\cdot t+\frac{BW}{2},\ t<\frac{T}{2} \\ R\cdot t-\frac{BW}{2},\ \frac{T}{2}<t<T \end{cases},\ \text{and}\ f_2(t)=R\cdot t,$$

where R is a frequency change rate of the first sensing signal or a frequency change rate of the second sensing signal, BW is a bandwidth of the first sensing signal, and T is a signal period of $f_1(t)$. The preset threshold is $|f_1(t)-f_2(t)|$, $A_1$ is an amplitude of the first sensing signal, and $A_2$ is an amplitude of the second sensing signal.

$A_1$ and $A_2$ are greater than 0. Optionally, $A_1$ and $A_2$ are 1.

202: The first communication apparatus determines a third sensing signal.

The third sensing signal is obtained based on a first data signal and the first sensing signal. The first data signal is a data signal to be sent by the first communication apparatus to the second communication apparatus. A first frequency difference between the frequency of the second sensing signal and a frequency of the third sensing signal is a preset threshold. For related descriptions of the preset threshold, refer to descriptions in step 201. Details are not described herein.

Specifically, the first communication apparatus modulates the first data signal to the first sensing signal to obtain the third sensing signal.

Example 1: The first sensing signal is $S_1=\sin f_1(t)t$, and the first data signal is s(t). It can be learned that the third sensing signal is $S_3=s(t)\sin f_1(t)t$. The second sensing signal is $S_2=\sin f_2(t)t$. It can be learned that the first frequency difference between the second sensing signal and the third sensing signal is $S'=f_2(t)-f_1(t)$. That is, the preset threshold is $|f_1(t)-f_2(t)|$.

Example 2: The first sensing signal is $s_1(t)=A_1e^{2\pi f_1(t)t}$, and the first data signal is $s_D(t)$. It can be learned that the third sensing signal is $s_3(t)=A_1 s_D(t)e^{2\pi f_1(t)t}$. The second sensing signal is $s_2(t)=A_2e^{2\pi f_2(t)t}$. The first frequency difference between the second sensing signal and the third sensing signal is $f_2(t)-f_1(t)$. That is, the preset threshold is $|f_1(t)-f_2(t)|$.

As shown in FIG. 3C, when t is between 0 and T/2, $f_1(t)-f_2(t)=BW/2$, or when t is between T/2 and T, $f_2(t)-f_1(t)=BW/2$. It can be learned from this that the difference between $f_1(t)$ and $f_2(t)$ is a fixed value. It can be learned from this that $f_1(t)$ and $f_2(t)$ are still linear sweep signals. Because a resolution sensed by a radar is directly proportional to a bandwidth of the sensing signal, a wider bandwidth indicates a higher resolution. A sweep bandwidth is a maximum bandwidth supported by the first communication apparatus, that is, the bandwidth of the sensing signal remains unchanged. In this embodiment, data communication between the first communication apparatus and the second communication apparatus is implemented without affecting sensing precision.

Optionally, the first data signal is a downlink data signal. For example, the first communication apparatus is a network device, the second communication apparatus is a terminal device, and the first data signal is a downlink data signal to be sent by the network device to the terminal device.

203: The first communication apparatus sends the second sensing signal and the third sensing signal.

Specifically, the first communication apparatus simultaneously sends the second sensing signal and the third sensing signal by using an antenna. Optionally, the antenna is a multiple band antenna or a single band antenna. If the antenna is the multiple band antenna, the first communication apparatus may simultaneously send the second sensing signal and the third sensing signal by using a same antenna. If the antenna is the single band antenna, the first communication apparatus separately sends the second sensing signal and the third sensing signal by using different antennas.

Optionally, the first communication apparatus sends the second sensing signal by using a first antenna, and sends the third sensing signal by using a second antenna.

The first antenna is a first group of antennas, and the second antenna is a second group of antennas. The first group of antennas and the second group of antennas each include one or more antennas. Optionally, the first antenna is a multiple band antenna or a single band antenna, and the second antenna is a multiple band antenna or a single band antenna.

Figure 3D:
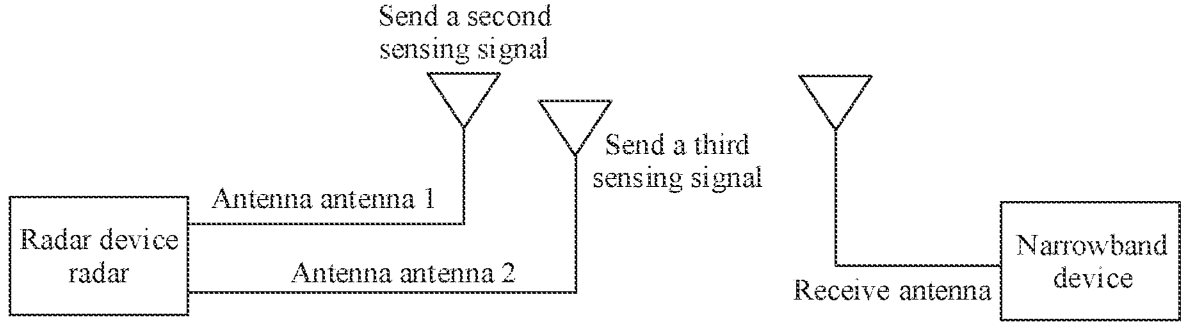
FIG. 3D is a schematic diagram of another scenario of a communication method according to an embodiment of this application.

With reference to Example 2, as shown in FIG. 3D, a radar device sends the third sensing signal $s_3(t)=s_D(t)\, e^{2\pi f_1(t)t}$ by using an antenna 1, and sends the second sensing signal $s_2(t)=e^{2\pi f_2(t)t}$ by using an antenna 2.

204: The second communication apparatus receives the second sensing signal and the third sensing signal.

When the second sensing signal and the third sensing signal pass through a non-linear circuit of the second communication apparatus, a first harmonic signal is generated, the first harmonic signal carries the first data signal, and the first harmonic signal is used by the second communication apparatus to obtain the first data signal.

For example, as shown in FIG. 3D, a narrowband device receives the second sensing signal and the third sensing signal by using a receive antenna.

The first harmonic signal is M times of the first frequency difference, where M is an integer greater than or equal to 1.

In this embodiment, a difference in bandwidths of the second sensing signal and the first data signal is matched by using a non-linear characteristic of the non-linear circuit in the second communication apparatus. The non-linear characteristic of the non-linear circuit is that an output signal includes a non-linear harmonic of an input signal. The input signal is a signal input to the non-linear circuit, and the output signal is a signal output from the non-linear circuit.

For example, when the input signal includes a signal of a frequency $f_{in}$, the non-linear harmonic includes a higher harmonic of the frequency $f_{in}$, for example, a second harmonic $2f_{in}$ and a third harmonic $3f_{in}$.

For example, when input signals include a signal whose frequency is $f_1$ and a signal whose frequency is $f_2$, a second harmonic is represented as:

$$S_{in}^2 = [\sin(2\pi f_1 t) + \sin(2\pi f_2 t)]^2 = \sin^2(2\pi f_1 t) + \sin^2(2\pi f_2 t) + 2\sin(2\pi f_1 t)\sin(2\pi f_2 t) = \frac{1}{2}[2 - \cos(2\pi 2 f_1 t) - \cos(2\pi 2 f_2 t) + 2\cos(2\pi f_1 t - 2\pi f_2 t) - 2\cos(2\pi f_1 t + 2\pi f_2 t)]$$

It can be learned from this that the second harmonic includes signals whose frequencies are respectively $2f_1$, $2f_2$, $f_1-f_2$, and $f_1+f_2$. Because a frequency difference between the signal whose frequency is $f_1$ and the signal whose frequency is $f_2$ is a fixed value, a frequency of the signal of $f_1-f_2$ in the second harmonic is a fixed value, that is, the signal is a narrowband signal.

With reference to Example 1 in step 202, the following separately shows a case in which the frequency of the first harmonic signal is the first frequency difference and a case in which the frequency of the first harmonic signal is twice the first frequency difference.

The second sensing signal is $S_2=\sin f_2(t)t$, and the third sensing signal is $S_3=s(t)\sin f_1(t)t$. That is, the input signal of the non-linear circuit of the second communication apparatus includes the third sensing signal whose frequency is $f_1$ and the second sensing signal whose frequency is $f_2$.

A second harmonic included in the output signal of the non-linear circuit is specifically expressed as:

$$RX_1 = S_2 + S_3 + (S_2 + S_3)^2 + \ldots = \ldots + s^2(t)[\sin f_1(t)t]^2 + 2s(t)\sin f_1(t)t \sin f_2(t)t + [\sin f_2(t)t]^2 + \ldots = \ldots - s(t)\cos[f_1(t) + f_2(t)]t + s(t)\cos[f_1(t) - f_2(t)]t + \ldots$$

It can be learned from the expression of the second harmonic that the first data signal s(t) is modulated onto a signal whose frequency is $f_L=f_2(t)-f_1(t)$. It may be learned from step 202 and step 203 that the third sensing signal (a broadband signal) sent by the first communication apparatus carries the first data signal (a narrowband signal). In addition, after the second sensing signal and the third sensing signal pass through the non-linear circuit of the second communication apparatus, the second harmonic is generated. Therefore, the second communication apparatus demodulates the first harmonic signal $s(t)\cos[f_1(t)-f_2(t)]\,t$ included in the second harmonic, to obtain the first data signal s(t). That is, the first harmonic signal is $s(t)\cos[f_1(t)-f_2(t)]t$, and the frequency of the first harmonic signal is the first frequency difference, that is, $f_1(t)-f_2(t)$.

A fourth harmonic included in the output signal of the non-linear circuit is specifically expressed as:

$$RX_2 = S_2 + S_3 + (S_2 + S_3)^4 + \ldots = \ldots + s^4(t)[\sin f_1(t)t]^4 + 4s(t)\sin f_1(t)t[\sin f_2(t)t]^3 + 6s^2(t)[\sin f_1(t)t]^2[\sin f_2(t)t]^2 + 4s(t)s^3(t)[\sin f_1(t)t]^3\sin f_2(t)t + [\sin f_2(t)t]^4 + \ldots = \ldots 6s^2(t)\{\cos[f_1(t) + f_2(t)]t + \cos[f_1(t) - f_2(t)]t\}^2 + \ldots = \ldots + 3s^2(t)\{\cos 2[f_1(t) - f_2(t)]t + 1\} + \ldots$$

It can be learned from the expression of the fourth harmonic that the first data signal s(t) is modulated onto a signal whose frequency is $2(f_2(t)-f_1(t))$. It may be learned from step 202 and step 203 that the third sensing signal (the broadband signal) sent by the first communication apparatus carries the first data signal (the narrowband signal). In addition, after the second sensing signal and the third sensing signal pass through the non-linear circuit of the second communication apparatus, the fourth harmonic is generated. Therefore, the second communication apparatus demodulates the first harmonic signal $3s^2(t)\cos 2[f_1(t)-f_2(t)]\,t$ included in the fourth harmonic, to obtain the first data signal s(t). That is, the first harmonic signal is $3s^2(t)\cos 2[f_1(t)-f_2(t)]\,t$, and the frequency of the first harmonic signal is twice the first frequency difference, that is, $2[f_1(t)-f_2(t)]$.

With reference to Example 2, the third sensing signal is $s_3(t)=s_D(t)\ e^{2\pi f_1(t)t}$ and the second sensing signal is $s_2(t)=e^{2\pi f_2(t)t}$. When the second sensing signal and the third sensing signal pass through the non-linear circuit, a harmonic $s'^{(t)}=s_D(t)e^{2\pi f_L t}$ is generated. That is, the first data signal $s_D(t)$ is modulated to a frequency $f_L$. It is assumed that the second communication apparatus is a wireless fidelity (Wi-Fi) device, the first data signal $s_D$ (t) is a Wi-Fi baseband signal, and $f_L$ is 2.4 GHz, therefore, the generated harmonic can be directly demodulated by the Wi-Fi device.

It can be learned from step 204 that, in this embodiment of this application, matching between the sensing signal (the broadband signal) and the data signal (the narrowband signal) is implemented mainly based on the non-linear characteristic of the non-linear circuit of the second communication apparatus. In a radio frequency circuit, components such as an amplifier and a diode in the circuit are non-linear components, and have the non-linear characteristic. In addition to the non-linear characteristic generated by the non-linear circuit in the second communication apparatus, an additional non-linear element may be added to enhance the non-linear characteristic of the non-linear circuit.

Figure 3E:
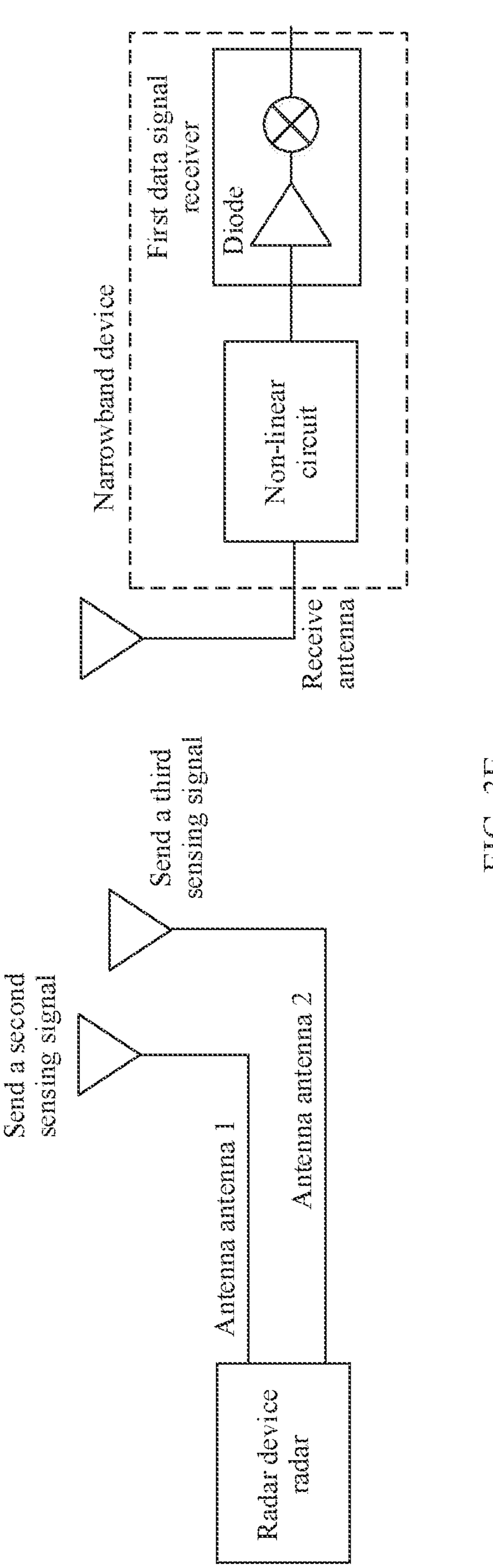
FIG. 3E is a schematic diagram of another scenario of a communication method according to an embodiment of this application.
Figure 3F:
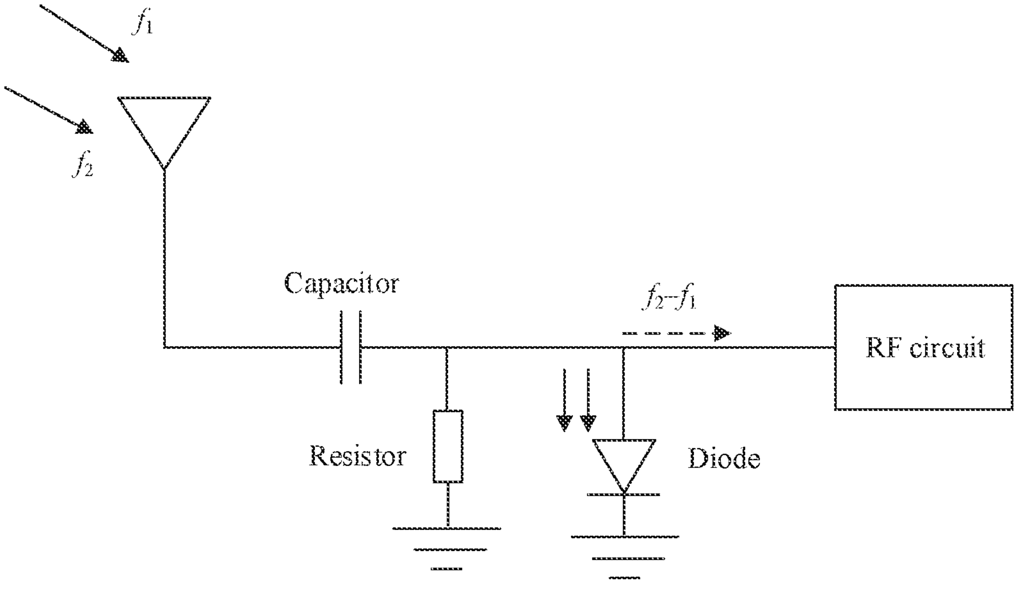
FIG. 3F is a schematic circuit diagram of a non-linear circuit according to an embodiment of this application.

For example, as shown in FIG. 3E, a non-linear circuit in the narrowband device is connected to a diode, and a non-linear characteristic of the non-linear circuit is enhanced by using the diode. The following shows a specific connection structure of FIG. 3E by using FIG. 3F. The non-linear circuit includes a capacitor and a resistor, and the capacitor is separately connected to the resistor and the diode. For a specific connection structure, refer to FIG. 3F. A receive antenna of the narrowband device receives the second sensing signal and the third sensing signal. When the second sensing signal and the third sensing signal pass through the non-linear circuit and the diode, the first harmonic signal is generated. As shown in FIG. 3F, the first harmonic signal is $s(t)\ \cos[f_1(t)-f_2\ (t)]t$, and the frequency of the first harmonic signal is the first frequency difference, that is, $f_1(t)-f_2\ (t)$.

Because energy of the non-linear harmonic is far less than energy of the sensing signal. Only a non-linear harmonic generated by a communication device near the radar device can be demodulated. A non-linear harmonic generated by a communication device far from the radar device is too weak to demodulate data sent by the radar device. Therefore, this embodiment may adapt to short-range communication.

Optionally, the embodiment shown in FIG. 2 further includes step 205 and step 206, and step 205 and step 206 are performed after step 204.

205: The first communication apparatus receives a second reflected signal.

The second reflected signal is a reflected signal of the second sensing signal.

206: The first communication apparatus determines a frequency difference between the second reflected signal and the second sensing signal, and performs sensing and measurement by using the frequency difference between the second reflected signal and the second sensing signal, to obtain a second sensing result.

Specifically, the first communication apparatus correlates the second reflected signal with the second sensing signal to obtain the frequency difference between the second reflected signal and the second sensing signal. Then, the first communication apparatus determines a distance of a target object in an ambient environment and a cross-sectional area and the like of the target object by using the frequency difference between the second reflected signal and the second sensing signal.

It can be learned from step 205 to step 206 that in this embodiment, the data communication between the first communication apparatus and the second communication apparatus is implemented without affecting sensing.

In a possible implementation, the embodiment shown in FIG. 2 further includes step 207 to step 208, and step 207 to step 208 are performed before step 201.

207: The first communication apparatus sends a first control signal.

The first control signal is used to indicate a third communication apparatus not to receive a data signal in a first time period. The third communication apparatus is a second-type communication apparatus, and the second communication apparatus is a first-type communication apparatus.

Optionally, the first-type communication apparatus is a Bluetooth device, and the second-type communication apparatus is a Wi-Fi device. Alternatively, the first-type communication apparatus is a Wi-Fi device, and the second-type communication apparatus is a Bluetooth device. Different types of communication apparatuses support different protocols.

In a communication system, for communication apparatuses supporting different protocols, one communication apparatus cannot learn about a data transmission status of another communication apparatus. Therefore, in this embodiment of this application, the first communication apparatus schedules the communication apparatuses supporting the different protocols to send data signals in different time periods, to avoid signal interference. In this embodiment, the first communication apparatus allocates, in a time division multiple access (TDMA) manner, spectrum resources to the communication apparatuses supporting the different protocols.

For example, as shown in FIG. 3E, the radar device divides time into a BLE time slot and a Wi-Fi time slot. In the BLE time slot, to avoid sending a data signal and receiving a data signal by the Wi-Fi device, the radar device sends a CTS-To-Self control packet. The CTS-To-Self control packet is used to indicate the Wi-Fi device to remain silent in the BLE time slot.

208: The first communication apparatus sends a second control signal to the second communication apparatus.

The second control signal is used to indicate the second communication apparatus to receive the first data signal in the first time period.

For example, the radar device sends a BLE beacon in the BLE time slot, wakes up the Bluetooth device by using the BLE beacon, and indicates the Bluetooth device to receive, in the first time period, the first data signal sent by the radar device. The Bluetooth device determines, based on the BLE beacon, to receive, in the first time period, the first data signal sent by the radar device.

Optionally, step 207 to step 208 show a manner in which the first communication apparatus controls, by using the control signals, the different types of communication apparatuses to receive the data signals. In actual application, the different types of communication apparatuses in the communication system may alternatively receive the data signals based on preset time periods. The preset time period may be specified in a communication protocol, or is set in advance by the first communication apparatus on the different types of communication apparatuses. For example, the different types of communication apparatuses may periodically receive the data signals based on preset periods. This is not specifically limited in this application.

Figure 3G:
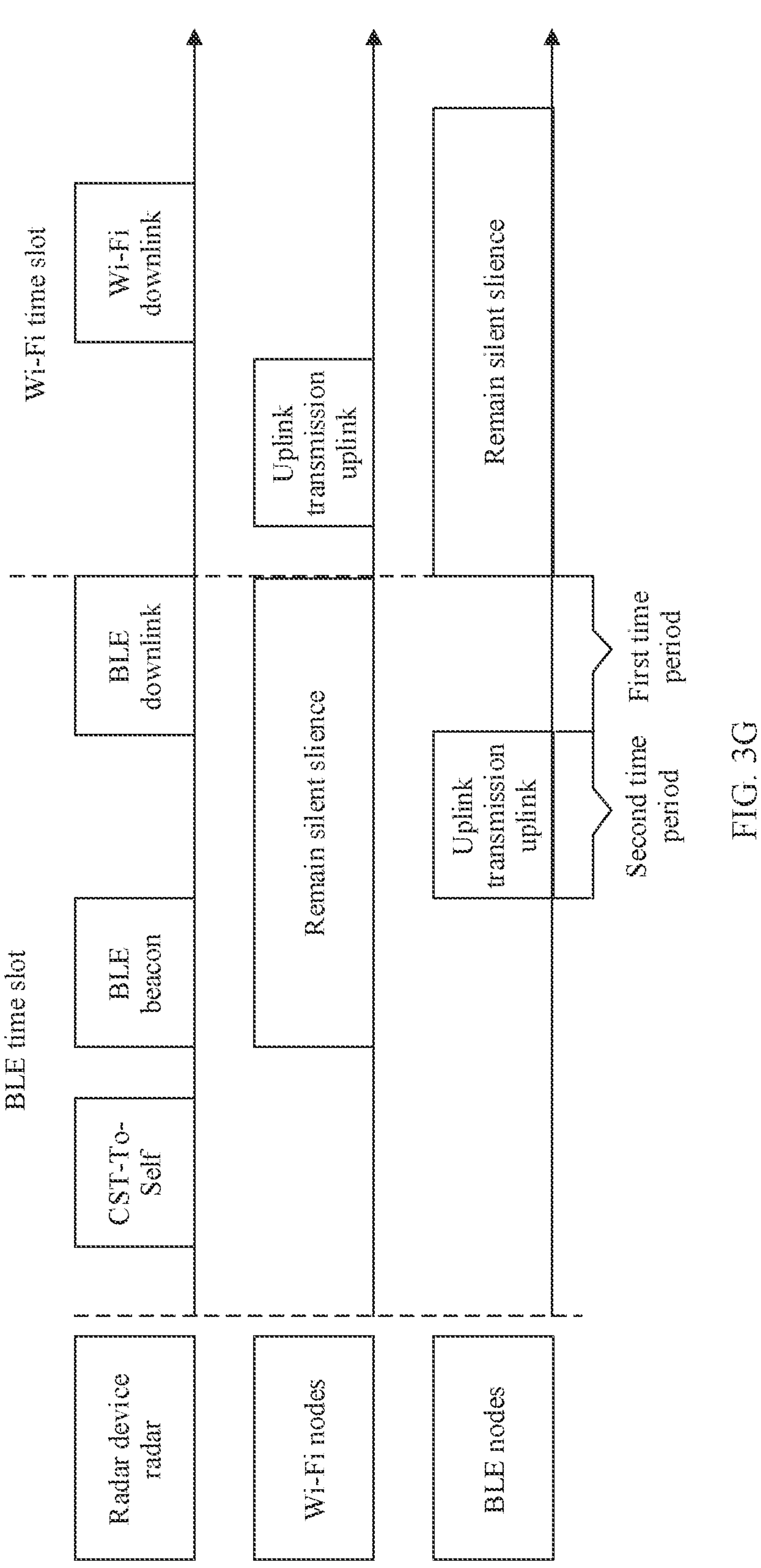
FIG. 3G is a schematic diagram of another scenario of a communication method according to an embodiment of this application.

It can be learned from FIG. 3G that the radar device can communicate with the communication apparatuses supporting the different protocols, and can become a gateway in a smart home, to coordinate different communication apparatuses supporting the different protocols. In addition, a control signal can be sent to an ambient communication apparatus based on a result of sensing the ambient environment by the radar device. Therefore, there is a significant application space in the smart home and a smart city.

In this embodiment of this application, the first communication apparatus determines the first sensing signal and the second sensing signal. Then, the first communication apparatus determines the third sensing signal. The third sensing signal is obtained based on the first data signal and the first sensing signal, and the first data signal is the data signal to be sent by the first communication apparatus to the second communication apparatus. The first frequency difference between the frequency of the second sensing signal and the frequency of the third sensing signal is the preset threshold. The first communication apparatus sends the second sensing signal and the third sensing signal. It can be learned from this that the first communication apparatus modulates the first data signal onto the third sensing signal, and the first frequency difference between the frequency of the second sensing signal and the frequency of the third sensing signal is the preset threshold. In this way, when the second sensing signal and the third sensing signal pass through the non-linear circuit of the second communication apparatus, the first harmonic signal is generated. The second communication apparatus obtains, by using the first harmonic signal, the first data signal carried in the first harmonic signal, thereby implementing the data communication between the first communication apparatus and the second communication apparatus, to improve utilization of the spectrum resources. That is, according to the technical solution in this embodiment of this application, data communication between the radar device and the narrowband device can be implemented, and sensing precision is not affected.

To facilitate the first communication apparatus to separately process the received reflected signal and the data signal sent by the second communication apparatus, an embodiment of this application proposes a technical solution shown in FIG. 4, and the technical solution is described below.

Figure 4:
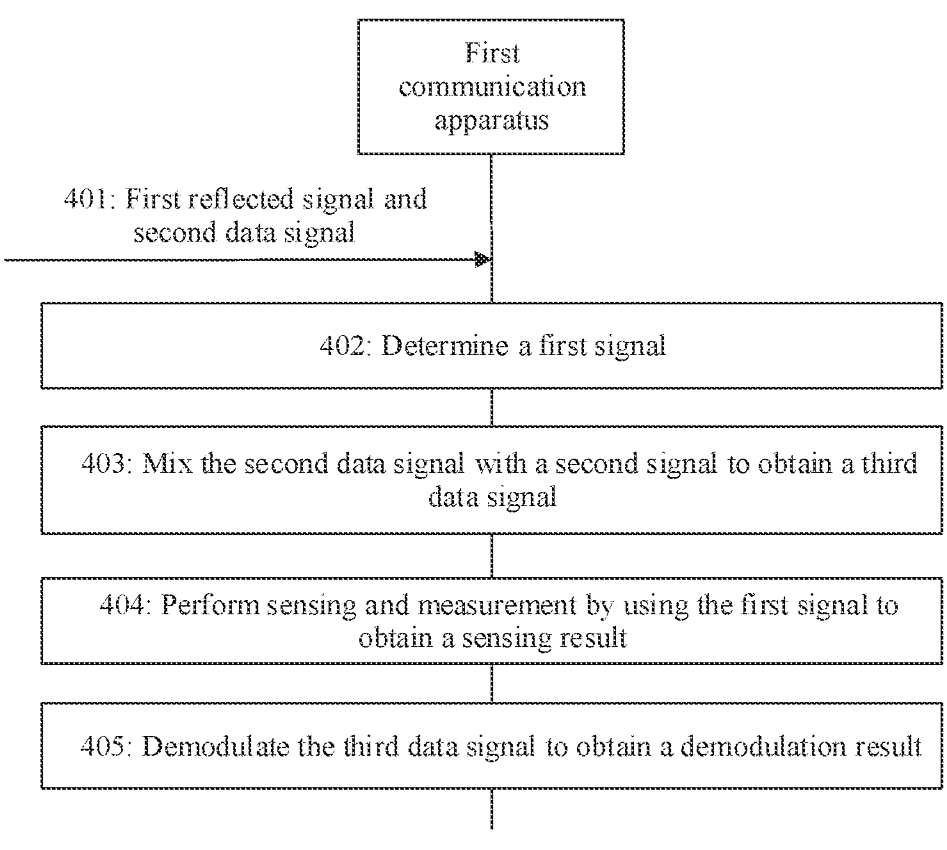
FIG. 4 is a schematic diagram of another embodiment of a communication method according to an embodiment of this application.

FIG. 4 is a schematic diagram of another embodiment of a communication method according to an embodiment of this application. In FIG. 4, the method includes the following steps.

401: A first communication apparatus receives a first reflected signal and a second data signal.

The first reflected signal is a reflected signal corresponding to a fourth sensing signal, and the second data signal is a data signal sent by a second communication apparatus to a first communication apparatus.

Optionally, the fourth sensing signal is the second sensing signal in the embodiment shown in FIG. 2, the first reflected signal is the second reflected signal in the embodiment shown in FIG. 2, and the second data signal is the uplink data signal sent by the second communication apparatus to the first communication apparatus. That is, the embodiment shown in FIG. 2 may be a basis of this embodiment.

402: The first communication apparatus determines a first signal.

The first signal is obtained based on the first reflected signal and the fourth sensing signal, and the first signal occupies a second frequency band.

The following shows two possible implementations in which the first communication apparatus determines the first signal.

Implementation 1: The first communication apparatus correlates the first reflected signal with the fourth sensing signal to obtain the first signal.

The first signal occupies the second frequency band, and the second frequency band includes a baseband frequency.

Figure 5A:
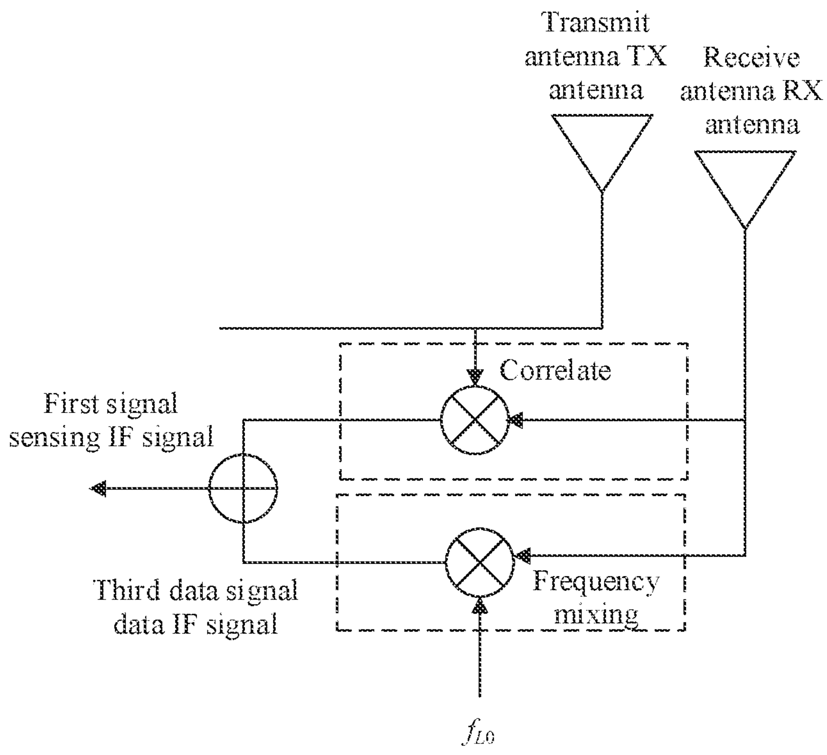
FIG. 5A is a schematic diagram of another scenario of a communication method according to an embodiment of this application.

For example, as shown in FIG. 5A, a receive end of the first communication apparatus receives the first reflected signal by using a receive antenna, and the first reflected signal is $s_{r1}(t)=Ae^{2\pi f_1(t-\tau)(t-\tau)}$, where A is an amplitude of the first reflected signal, and A is greater than 0. Then, a transmit end of the first communication apparatus inputs the fourth sensing signal to the receive end of the first communication apparatus, and the fourth sensing signal is $s_1(t)=e^{2\pi f_1(t)t}$. The first communication apparatus correlates the first reflected signal with the fourth sensing signal to obtain the first signal. That is, the first signal is $s_\tau(t)=s_1(t)\otimes s_{r1}(t)=Ae^{2\pi f_\tau t}$, where $\otimes$ refers to a related operation.

Implementation 2: The first communication apparatus correlates the first reflected signal with the fourth sensing signal to obtain a third signal. The first communication apparatus further mixes the third signal with the fourth signal to obtain the first signal.

The first signal occupies a second frequency band, the second frequency band does not include a baseband frequency, and a center frequency of the second frequency band is greater than B/2.

First, the center frequency of the second frequency band is described. For example, if the second frequency band is [0, 1 MHz], it can be learned that the center frequency of the second frequency band is 0.5 MHz.

Figure 5B:
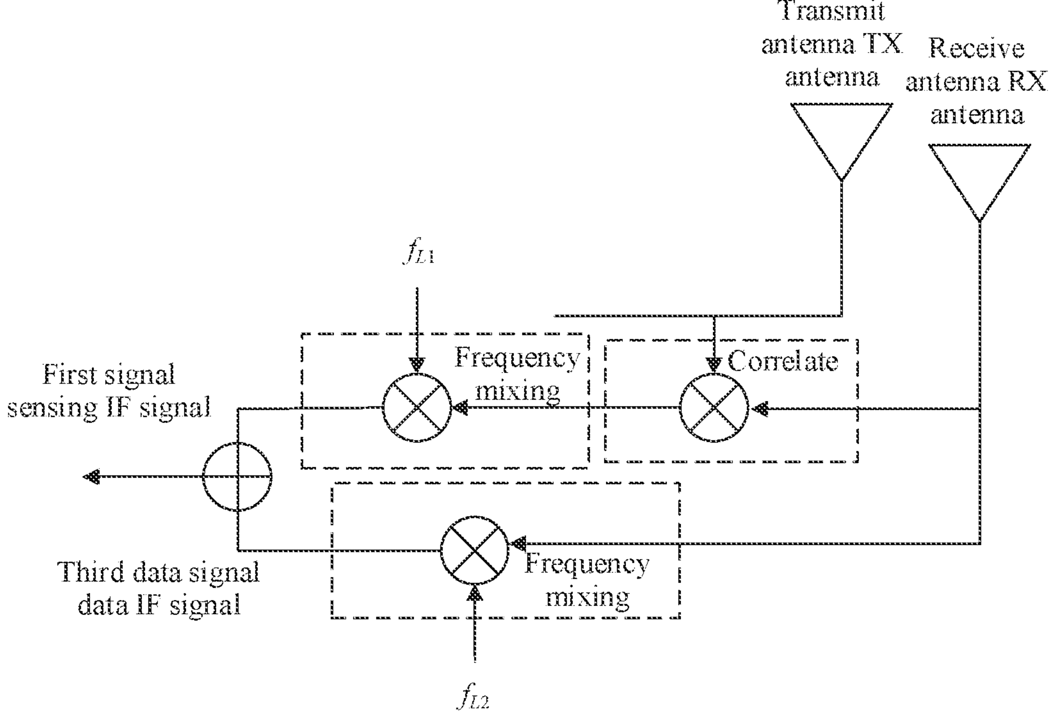
FIG. 5B is a schematic diagram of another scenario of a communication method according to an embodiment of this application.

For example, as shown in FIG. 5B, a receive end of the first communication apparatus receives the first reflected signal by using a receive antenna. Then, a transmit end of the first communication apparatus inputs the fourth sensing signal to the receive end of the first communication apparatus. The first communication apparatus correlates the first reflected signal with the fourth sensing signal to obtain a third signal which is specifically as $s_\tau(t)$ obtained in Implementation 1. Then, the first communication apparatus performs a frequency mixing operation on the third signal and a fourth signal whose frequency is $f_{L1}$, to obtain the first signal. That is, the first signal is $$s_\tau^{IF}(t)=s_\tau(t)\otimes\sin f_{L1}t=s_\tau(t)\sin f_{L1}t,$$

where $f_{L1}$ is greater than B/2, and $\otimes$ refers to the frequency mixing operation.

403: The first communication apparatus mixes the second data signal with a second signal to obtain a third data signal.

The third data signal occupies a first frequency band, the first frequency band does not cross the second frequency band, and one of the first frequency band and the second frequency band includes the baseband frequency. Optionally, the second signal is a local oscillator signal.

Based on Implementation 1 in step 402, the first frequency band includes the baseband frequency, the center frequency of the second frequency band is greater than a first value. The first value is a sum of half a bandwidth of the second data signal and a maximum value of a second frequency difference, and the second frequency difference is a difference between a frequency of the fourth sensing signal and a frequency of the first reflected signal.

In a possible implementation, the second data signal is $A_3 s_{data}(t)\sin f_L t$, and the second signal is $A_4 \sin f_{LO} t$. In this case, the third data signal is $$s_{data}^{IF}(t)=[A_3 s_{data}(t)\sin f_L t]\otimes A_4\sin f_{LO}t=A_3A_4s_{data}(t)\sin(f_L-f_{LO})t,$$

and a frequency of the third data signal is $f_L-f_{LO}>\Delta f_{max}+B/2$, where $\Delta f_{max}$ is the maximum value of the second frequency difference, B is the bandwidth of the second data signal, ⊗ refers to the frequency mixing operation, $A_3$ is greater than 0, $A_4$ is greater than 0, $A_3$ is an amplitude of the second data signal, and $A_4$ is an amplitude of the second signal. Optionally, $A_3$ and $A_4$ each are 1.

For example, the bandwidth of the second data signal is 1 MHz, and $\Delta f_{max}$ is 100 kHz. The first frequency band is [0, 0.1 MHz], and the second frequency band is [0.1 MHz, 1.1 MHz]. It can be learned from this that the two frequency bands do not cross with each other, to avoid interference between the sensing signal and the data signal. In addition, the first frequency band and the second frequency band are two continuous frequency bands, thereby improving utilization of spectrum resources.

For another example, the bandwidth of the second data signal is 1 MHz, and $\Delta f_{max}$ is 100 kHz. The first frequency band is [0, 0.1 MHz], and the second frequency band is [0.3 MHz, 1.3 MHz]. It can be learned from this that the two frequency bands do not cross with each other. The first frequency band and the second frequency band are two discontinuous frequency bands, to avoid interference between the sensing signal and the data signal, and improve signal transmission performance.

Based on Implementation 2 of step 402, the second frequency band occupied by the third data signal includes the baseband frequency.

The center frequency of the frequency band occupied by the second data signal is the same as a center frequency of a frequency band occupied by the second signal. For example, if the frequency band occupied by the second data signal is [0.1 MHz, 1.1 MHz], the center frequency of the frequency band occupied by the second data signal is 0.6 MHz. In this case, the center frequency of the frequency band occupied by the second signal is 0.6 MHz. That is, as shown in FIG. 5B, a frequency $f_{L2}$ of the second signal is 0.6 MHz.

For example, the bandwidth of the second data signal is 1 MHz, and $\Delta f_{max}$ is 100 kHz. The center frequency of the second frequency band is greater than B/2, and B is the bandwidth of the second data signal. In this case, the second frequency band may be [0.5 MHz, 0.6 MHz], and the first frequency band is [−0.5 MHz, 0.5 MHz].

For another example, the bandwidth of the second data signal is 1 MHz, and $\Delta f_{max}$ is 100 kHz. The center frequency of the second frequency band is greater than B, the first frequency band is [0, 1 MHz], and the second frequency band is [1 MHz, 1.1 MHz].

It can be learned from the foregoing example that the first frequency band does not cross the second frequency band, to avoid interference between the sensing signal and the data signal. In addition, the first frequency band and the second frequency band are two continuous frequency bands, thereby improving utilization of spectrum resources.

404: The first communication apparatus performs sensing and measurement by using the first signal to obtain a sensing result.

Specifically, the first communication apparatus determines the difference between the frequencies of the first reflected signal and the fourth sensing signal by using the first signal, and senses a distance, a cross-sectional area, and the like of a target object in an ambient environment by using the frequency difference.

For example, the first communication apparatus determines, by using data of the frequency band [0, 0.1 MHz], that the difference between the frequencies of the first reflected signal and the fourth sensing signal is 0.1 MHz, and then determines the distance and the cross-sectional area of the target object by using the frequency difference.

405: The first communication apparatus demodulates the third data signal to obtain a demodulation result.

For example, the first communication apparatus demodulates data of the frequency band [0.1 MHz, 1.1 MHz], to obtain data sent by the second communication apparatus.

In a possible implementation, the embodiment shown in FIG. 4 further includes step 406 and step 407.

406: The first communication apparatus sends a third control signal to a third communication apparatus.

The third control signal is used to indicate the third communication apparatus not to send a data signal in a second time period. The third communication apparatus is a second-type communication apparatus, and the second communication apparatus is a first-type communication apparatus.

Optionally, the first-type communication apparatus is a Bluetooth device, and the second-type communication apparatus is a Wi-Fi device. Alternatively, the first-type communication apparatus is a Wi-Fi device, and the second-type communication apparatus is a Bluetooth device. Different types of communication apparatuses support different protocols.

For example, as shown in FIG. 3G, the radar device sends a CTS-To-Self control packet. The CTS-To-Self control packet is used to indicate the Wi-Fi device to remain silent in a BLE time slot.

407: The first communication apparatus sends a fourth control signal to the second communication apparatus.

The fourth control signal is used to indicate the second communication apparatus to send the second data signal in the second time period.

For example, as shown in FIG. 3G, the radar device sends a BLE beacon in the BLE time slot, wakes up the Bluetooth device by using the BLE beacon, and indicates the Bluetooth device to send the second data signal to the radar device in the second time period. The Bluetooth device sends the second data signal to the radar device in the second time period.

Optionally, step 406 to step 407 show a manner in which the first communication apparatus controls, by using the control signals, different types of communication apparatuses to send the data signals. In actual application, the different types of communication apparatuses in a communication system may send the data signals based on preset time periods. The preset time period may be specified in a communication protocol, or is set in advance by the first communication apparatus on the different types of communication apparatuses. For example, the different types of communication apparatuses may periodically send the data signals to the first communication apparatus based on preset periods. This is not specifically limited in this application.

It can be learned from FIG. 3G that the radar device can communicate with communication apparatuses supporting different protocols, and can become a gateway in a smart home, to coordinate different communication apparatuses supporting the different protocols. In addition, the control signal can be sent to an ambient communication apparatus based on a result of sensing the ambient environment by the radar device. Therefore, there is a significant application space in the smart home and a smart city.

In this embodiment of this application, the first communication apparatus receives the first reflected signal and the second data signal. The first reflected signal is a reflected signal of the fourth sensing signal, and the second data signal is a data signal sent by the second communication apparatus to the first communication apparatus. Then, the first communication apparatus determines the first signal, and the first signal is determined based on the first reflected signal and the fourth sensing signal. The first communication apparatus mixes the second data signal with the second signal to obtain the third data signal. The third data signal occupies the first frequency band, and the first signal occupies the second frequency band. The first frequency band does not cross the second frequency band, and one of the first frequency band and the second frequency band includes the baseband frequency. The first communication apparatus performs sensing and measurement by using the first signal to obtain the sensing result. The first communication apparatus demodulates the third data signal to obtain the demodulation result. Therefore, the first communication apparatus staggers the frequency band occupied by the data signal sent by the second communication apparatus and the frequency band occupied by the sensing signal, so that the first communication apparatus separately processes the data signal and the sensing signal.

Figure 6:
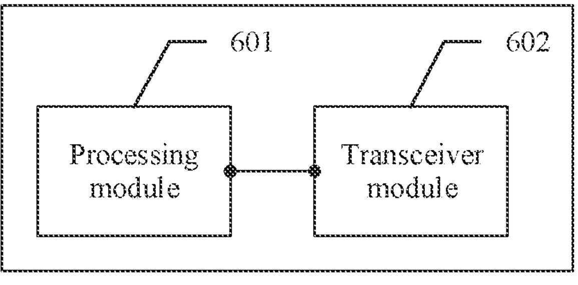
FIG. 6 is a schematic diagram of a structure of a first communication apparatus according to an embodiment of this application.

The following describes a first communication apparatus provided in an embodiment of this application. FIG. 6 is a schematic diagram of a structure of a first communication apparatus according to an embodiment of this application. The first communication apparatus may be configured to perform the steps performed by the first communication apparatus in the embodiment shown in FIG. 2, and reference may be made to related descriptions in the foregoing method embodiments.

The first communication apparatus includes a processing module 601 and a transceiver module 602.

The processing module 601 is configured to determine a first sensing signal and a second sensing signal; and determine a third sensing signal, where the third sensing signal is obtained based on a first data signal and the first sensing signal, the first data signal is a data signal to be sent by the first communication apparatus to a second communication apparatus, and a first frequency difference between a frequency of the second sensing signal and a frequency of the third sensing signal is a preset threshold.

The transceiver module 602 is configured to send the second sensing signal and the third sensing signal.

In a possible implementation, the transceiver module 602 is specifically configured to:

send the second sensing signal by using a first antenna, and send the third sensing signal by using a second antenna.

In another possible implementation, the first sensing signal is $s_1(t)=A_1e^{2\pi f_1(t)t}$, the second sensing signal is $s_2(t)=A_2e^{2\pi f_2(t)t}$, and the third sensing signal is $$s_1(t) = s_D(t)A_1e^{2\pi f_1(t)t},$$

$$\text{where } f_1(t) = \begin{cases} R\cdot t + \dfrac{BW}{2}, & t < \dfrac{T}{2} \\ R\cdot t - \dfrac{BW}{2}, & \dfrac{T}{2} < t < T \end{cases}, \quad f_2(t) = R\cdot t,$$

$s_D(t)$ is the first data signal, R is a frequency change rate of the second sensing signal or a frequency change rate of the third sensing signal, BW is a bandwidth of the third sensing signal, T is a signal period of $f_1(t)$, the preset threshold is $|f_1(t)-f_2(t)|$, $|x|$ refers to taking an absolute value of x, $A_1$ is greater than 0, $A_2$ is greater than 0, $A_1$ is an amplitude of the first sensing signal, and $A_2$ is an amplitude of the second sensing signal.

In another possible implementation, the second communication apparatus is a first-type communication apparatus. The transceiver module 602 is further configured to:

send a first control signal, where the first control signal is used to indicate a third communication apparatus not to receive a data signal in a first time period, and the third communication apparatus is a second-type communication apparatus; and send a second control signal to the second communication apparatus, where the second control signal is used to indicate the second communication apparatus to receive the first data signal in the first time period.

In this embodiment of this application, the processing module 601 determines the first sensing signal and the second sensing signal; and determine the third sensing signal, where the third sensing signal is obtained based on the first data signal and the first sensing signal, the first data signal is the data signal to be sent by the first communication apparatus to the second communication apparatus, and the first frequency difference between the frequency of the second sensing signal and the frequency of the third sensing signal is the preset threshold. The transceiver module 602 sends the second sensing signal and the third sensing signal. In this way, when the second sensing signal and the third sensing signal pass through a non-linear circuit of the second communication apparatus, a first harmonic signal is generated. The second communication apparatus obtains, by using the first harmonic signal, the first data signal carried in the first harmonic signal, thereby implementing data communication between the first communication apparatus and the second communication apparatus without affecting sensing an ambient environment by the first communication apparatus, to improve utilization of spectrum resources. That is, according to the technical solution in this embodiment of this application, data communication between a radar device and a narrowband device can be implemented.

Figure 7:
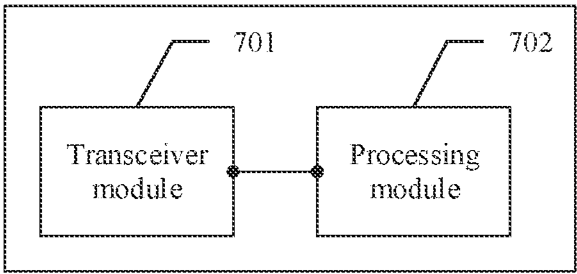
FIG. 7 is a schematic diagram of a structure of a second communication apparatus according to an embodiment of this application.

The following describes a second communication apparatus provided in an embodiment of this application. FIG. 7 is a schematic diagram of a structure of a second communication apparatus according to an embodiment of this application. The second communication apparatus may be configured to perform the steps performed by the second communication apparatus in the embodiment shown in FIG. 2, and reference may be made to related descriptions in the foregoing method embodiments.

The second communication apparatus includes a transceiver module 701. Optionally, the second communication apparatus further includes a processing module 702.

The transceiver module 701 is configured to receive a second sensing signal and a third sensing signal, where the third sensing signal is obtained based on a first data signal and a first sensing signal, and the first data signal is a data signal sent by the first communication apparatus to the second communication apparatus.

In a possible implementation, when the second sensing signal and the third sensing signal pass through a non-linear circuit of the second communication apparatus, a first harmonic signal is generated, and the first harmonic signal carries the first data signal.

In another possible implementation, the first harmonic signal is M times of a first frequency difference, and the first frequency difference is a frequency difference between a frequency of the second sensing signal and a frequency of the third sensing signal, where M is an integer greater than or equal to 1.

In another possible implementation, the second communication apparatus is a first-type communication apparatus. The transceiver module 701 is further configured to:

receive a second control signal sent by the first communication apparatus.

The processing module 702 is configured to determine, based on the second control signal, to receive the first data signal in a first time period.

In this embodiment of this application, the transceiver module 701 receives the second sensing signal and the third sensing signal that are sent by the first communication apparatus, to obtain the first data signal carried in the third sensing signal, thereby implementing data communication between the first communication apparatus and the second communication apparatus without affecting sensing an ambient environment by the first communication apparatus, to improve utilization of spectrum resources. That is, according to the technical solution in this embodiment of this application, data communication between a radar device and a narrowband device can be implemented.

Figure 8:
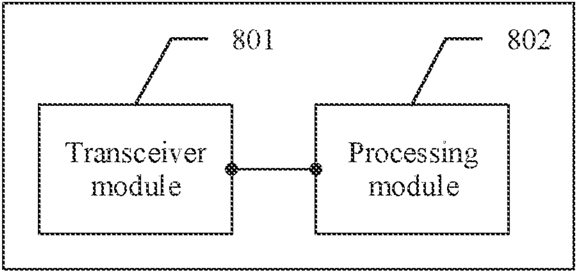
FIG. 8 is a schematic diagram of another structure of a first communication apparatus according to an embodiment of this application.

The following describes a first communication apparatus provided in an embodiment of this application. FIG. 8 is a schematic diagram of a structure of a first communication apparatus according to an embodiment of this application. The first communication apparatus may be configured to perform the steps performed by the first communication apparatus in the embodiment shown in FIG. 4, and reference may be made to related descriptions in the foregoing method embodiments.

The first communication apparatus includes a transceiver module 801 and a processing module 802.

The transceiver module 801 is configured to receive a first reflected signal and a second data signal, where the first reflected signal is a reflected signal corresponding to a fourth sensing signal, and the second data signal is a data signal sent by a second communication apparatus to the first communication apparatus.

The processing module 802 is configured to: determine a first signal, where the first signal is obtained based on the first reflected signal and the fourth sensing signal; mix the second data signal with a second signal to obtain a third data signal, where the third data signal occupies a first frequency band, the first signal occupies a second frequency band, the first frequency band does not cross the second frequency band, and one of the first frequency band and the second frequency band includes a baseband frequency; perform sensing and measurement by using the first signal to obtain a sensing result; and demodulate the third data signal to obtain a demodulation result.

In a possible implementation, the processing module 802 is specifically configured to:

correlate the first reflected signal with the fourth sensing signal to obtain the first signal, where the second frequency band occupied by the first signal includes the baseband frequency.

In another possible implementation, a center frequency of the first frequency band is greater than a first value, the first value is a sum of half a bandwidth of the second data signal and a maximum value of a second frequency difference, and the second frequency difference is a difference between a frequency of the fourth sensing signal and a frequency of the first reflected signal.

In another possible implementation, the second data signal is $A_3 s_{data}(t)\sin f_L t$, the second signal is $A_4 \sin f_{LO} t$, the third data signal is $$s_{data}^{IF}(t) = [A_3 s_{data}(t)\sin f_L t] \otimes A_4 \sin f_{LO} t = A_3 A_4 s_{data}(t)\sin(f_L - f_{LO})t,$$

and a frequency of the third data signal is $f_L - f_{LO} > \Delta f_{max} + B/2$, where $\Delta f_{max}$ is the maximum value of the second frequency difference, B is the bandwidth of the second data signal, $\otimes$ refers to a frequency mixing operation, $A_3$ is greater than 0, $A_4$ is greater than 0, $A_3$ is an amplitude of the second data signal, and $A_4$ is an amplitude of the second signal.

In another possible implementation, the processing module 802 is specifically configured to:

correlate the first reflected signal with the fourth sensing signal to obtain a third signal; and mix the third signal with a fourth signal to obtain the first signal, where a center frequency of the second frequency band occupied by the first signal is greater than half the bandwidth of the second data signal.

In this embodiment, the first communication apparatus staggers the frequency band occupied by the data signal sent by the second communication apparatus and the frequency band occupied by the sensing signal, so that the first communication apparatus separately processes the data signal and the sensing signal. In this way, the sensing signal and the data signal do not interfere with each other and affect each other.

Figure 9:
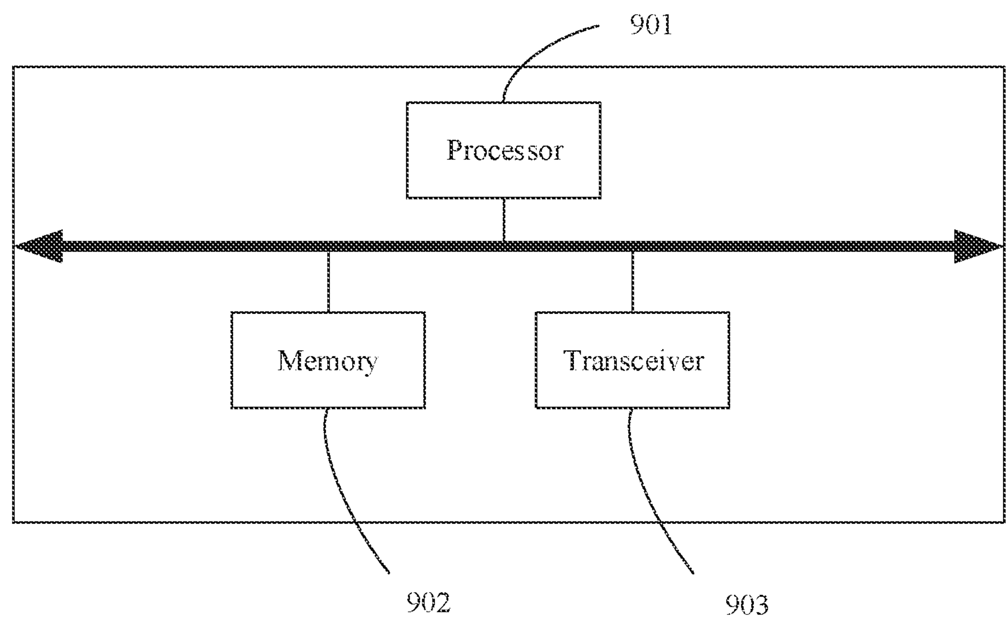
FIG. 9 is a schematic diagram of another structure of a first communication apparatus according to an embodiment of this application.

This application further provides a first communication apparatus. FIG. 9 is a schematic diagram of another structure of a first communication apparatus according to this embodiment of this application. The first communication apparatus may be configured to perform the steps performed by the first communication apparatus in the embodiment shown in FIG. 2, and reference may be made to related descriptions in the foregoing method embodiments.

The first communication apparatus includes a processor 901 and a memory 902. Optionally, the first communication apparatus further includes a transceiver 903.

In a possible implementation, the processor 901, the memory 902, and the transceiver 903 are separately connected by using a bus, and the memory stores computer instructions.

The processing module 601 in the foregoing embodiment may be specifically the processor 901 in this embodiment. Therefore, a specific implementation of the processor 901 is not described. The transceiver module 602 in the foregoing embodiment may be specifically the transceiver 903 in this embodiment. Therefore, a specific implementation of the transceiver 903 is not described.

Figure 10:
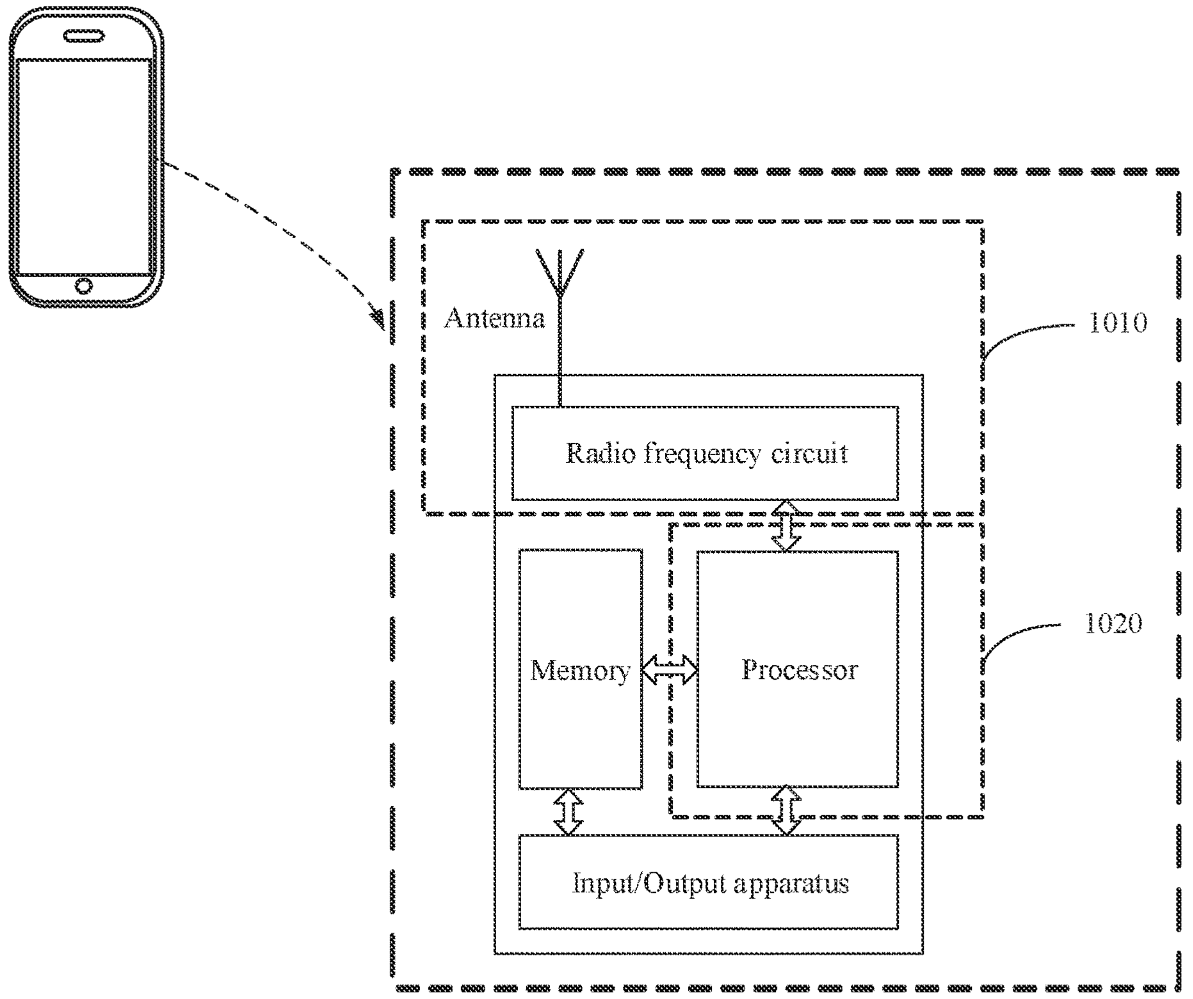
FIG. 10 is a schematic diagram of another structure of a second communication apparatus according to an embodiment of this application.

The following shows, by using FIG. 10, a possible schematic diagram of a structure of a second communication apparatus being a terminal device.

FIG. 10 is a simplified schematic diagram of a structure of a terminal device. For ease of understanding and illustration, in FIG. 10, a mobile phone is used as an example of the terminal device. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store a software program and data. The radio frequency circuit is mainly configured to: perform conversion between a baseband signal and a radio frequency signal and process the radio frequency signal. The antenna is mainly configured to: receive and send radio frequency signals in a form of an electromagnetic wave. The input/output apparatus, for example, a touchscreen, a display, or a keyboard, is mainly configured to: receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 10 shows only one memory and a processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna and a radio frequency circuit that have a transceiver function may be considered as a transceiver unit of the terminal device, and a processor that has a processing function is considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is configured to implement a receiving function and that is in the transceiver unit 1010 may be considered as a receiving unit, and a component that is configured to implement a sending function and that is in the transceiver unit 1010 may be considered as a sending unit, that is, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit may also be sometimes referred to as a transmitter machine, a transmitter, a transmitter circuit, or the like.

It should be understood that the transceiver unit 1010 is configured to perform a sending operation and a receiving operation of the second communication apparatus in the foregoing method embodiments. The processing unit 1020 is configured to perform other operations of the second communication apparatus other than the receiving and sending operations in the foregoing method embodiments.

For example, in a possible implementation, the transceiver unit 1010 is configured to perform a transceiver operation of the second communication apparatus in step 204 in FIG. 2, and/or the transceiver unit 1010 is further configured to perform other receiving and sending steps of the second communication apparatus in embodiments of this application.

When the terminal device is a chip, the chip includes a transceiver unit and a processing unit. The transceiver unit may be an input/output circuit or a communication interface. The processing unit is a processor, a microprocessor, or an integrated circuit integrated on the chip.

Figure 11:
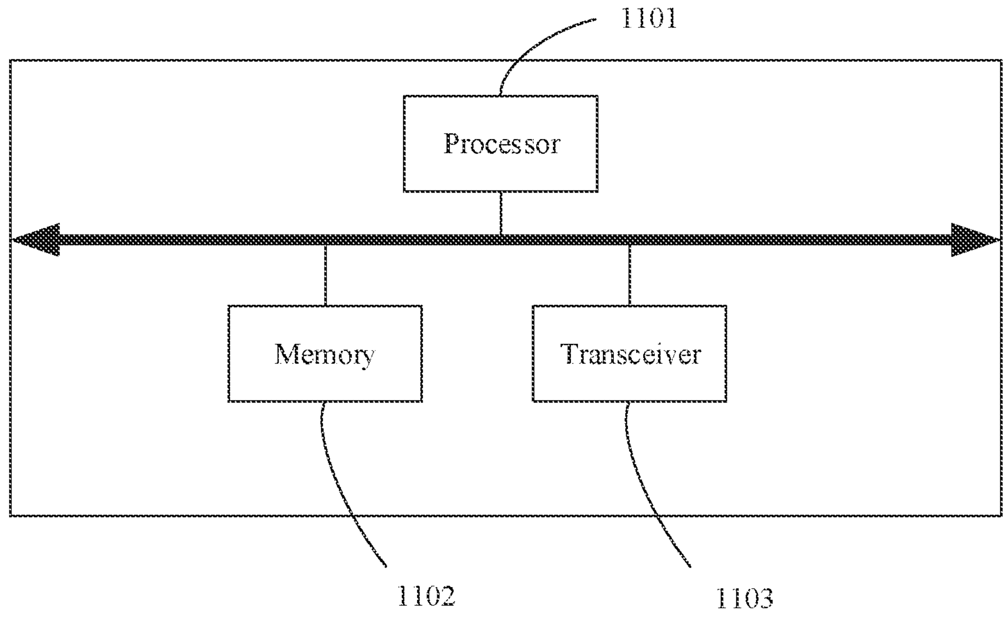
FIG. 11 is a schematic diagram of another structure of a first communication apparatus according to an embodiment of this application.

This application further provides a first communication apparatus. FIG. 11 is a schematic diagram of another structure of a first communication apparatus according to this embodiment of this application. The first communication apparatus may be configured to perform the steps performed by the first communication apparatus in the embodiment shown in FIG. 4, and reference may be made to related descriptions in the foregoing method embodiments.

The first communication apparatus includes a processor 1101 and a memory 1102. Optionally, the first communication apparatus further includes a transceiver 1103.

In a possible implementation, the processor 1101, the memory 1102, and the transceiver 1103 are separately connected by using a bus, and the memory stores computer instructions.

The processing module 802 in the foregoing embodiment may be specifically the processor 1101 in this embodiment. Therefore, a specific implementation of the processor 1101 is not described. The transceiver module 801 in the foregoing embodiment may be specifically the transceiver 1103 in this embodiment. Therefore, a specific implementation of the transceiver 1103 is not described.

Figure 12:
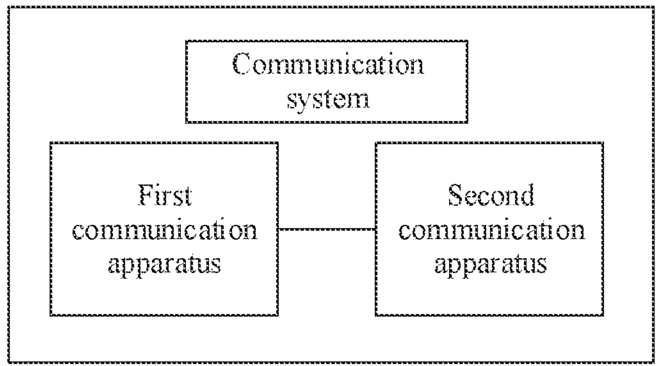
FIG. 12 is a schematic diagram of a communication system according to an embodiment of this application.

With reference to FIG. 12, an embodiment of this application further provides a communication system. The communication system includes the first communication apparatus shown in FIG. 6 and the second communication apparatus shown in FIG. 7. The first communication apparatus shown in FIG. 6 is configured to perform all or some steps performed by the first communication apparatus in the embodiment shown in FIG. 2. The second communication apparatus shown in FIG. 7 is configured to perform all or some steps performed by the second communication apparatus in the embodiment shown in FIG. 2.

Optionally, the first communication apparatus shown in FIG. 6 is further configured to perform all or some steps performed by the first communication apparatus in the embodiment shown in FIG. 4.

An embodiment of this application further provides a computer program product including instructions. When the computer program product runs on a computer, the computer is enabled to perform the communication methods in the embodiments shown in FIG. 2 and FIG. 4.

An embodiment of this application further provides a computer-readable storage medium, including computer instructions. When the computer instructions are run on a computer, the computer is enabled to perform the communication methods in the embodiments shown in FIG. 2 and FIG. 4.

An embodiment of this application further provides a chip apparatus, including a processor. The processor is configured to connect to a memory and invoke a program stored in the memory, so that the processor is enabled to perform the communication methods in the embodiments shown in FIG. 2 and FIG. 4.

The processor mentioned above may be a general-purpose central processing unit, a microprocessor, an application-specific integrated circuit (ASIC), or one or more integrated circuits configured to control program execution of the communication methods in the embodiments shown in FIG. 2 and FIG. 4. The memory mentioned above may be a read-only memory (ROM) or another type of static storage device capable of storing static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions described in the foregoing embodiments or equivalent replacements to some technical features thereof may still be made, without departing from the scope of the technical solutions of embodiments of this application.

What is claimed is:

1. A communication method, wherein the method comprises:

receiving, by a first communication apparatus, a first reflected signal and a second data signal, wherein the first reflected signal is a reflected signal corresponding to a fourth sensing signal, and the second data signal is a data signal sent by a second communication apparatus to the first communication apparatus;

determining, by the first communication apparatus, a first signal, wherein the first signal is obtained based on the first reflected signal and the fourth sensing signal;

mixing, by the first communication apparatus, the second data signal and a second signal to obtain a third data signal, wherein the third data signal occupies a first frequency band, the first signal occupies a second frequency band that does not overlap with the first frequency band to enable sensing without interference from the third data signal, and one of the first frequency band and the second frequency band comprises a baseband frequency;

performing, by the first communication apparatus and based on the first signal, sensing to obtain a sensing result; and demodulating, by the first communication apparatus, the third data signal to obtain a demodulation result, wherein the second data signal is $A_3 s_{data}(t) \sin f_L t$, the second signal is $A_4 \sin f_{LO} t$, the third data signal is $$s_{data}^{IF}(t) = [A_3 s_{data}(t) \sin f_L t] \otimes A_4 \sin f_{LO} t = A_3 A_4 s_{data}(t) \sin(f_L - f_{LO}) t,$$

and a frequency of the third data signal is $f_L - L_{LO} > \Delta f_{max} + B/2$, wherein $\Delta f_{max}$ is the maximum value of the second frequency difference, B is the bandwidth of the second data signal, $\otimes$ represents a frequency mixing operation, $A_3$ is an amplitude of the second data signal, and $A_4$ is an amplitude of the second signal.

2. The method according to claim 1, wherein determining the first signal comprises:

correlating, by the first communication apparatus, the first reflected signal with the fourth sensing signal, to obtain the first signal, wherein the second frequency band occupied by the first signal comprises the baseband frequency.

3. The method according to claim 1, wherein a center frequency of the first frequency band is greater than a first value, the first value is a sum of half a bandwidth of the second data signal and a maximum value of a second frequency difference, and the second frequency difference is a difference between a frequency of the fourth sensing signal and a frequency of the first reflected signal.

4. The method according to claim 1, wherein determining the first signal comprises:

correlating, by the first communication apparatus, the first reflected signal with the fourth sensing signal, to obtain a third signal; and mixing, by the first communication apparatus, the third signal and a fourth signal to obtain the first signal, wherein a center frequency of the second frequency band and occupied by the first signal is greater than half the bandwidth of the second data signal.

5. A communication apparatus comprising:

at least one processor; and one or more memories coupled to the at least one processor and storing programming instructions for execution by the at least one processor to perform operations comprising:

determining a first sensing signal and a second sensing signal;

determining a third sensing signal, wherein the third sensing signal is obtained based on a first data signal and the first sensing signal, wherein the first data signal is a data signal to be sent by the first communication apparatus to a second communication apparatus, and wherein a first frequency difference between a frequency of the second sensing signal and a frequency of the third sensing signal is predetermined; and sending the second sensing signal and the third sensing signal, wherein the first sensing signal is $s_1(t)=A_1e^{2\pi f_1(t)t}$, the second sensing signal is $s_2(t)=A_2e^{2\pi f_2(t)t}$, and the third sensing signal is $s_1(t)=s_D(t)A_1e^{2\pi f_1(t)t}$, wherein $$f_1(t)=\begin{cases} R\cdot t+\frac{BW}{2}, & t<\frac{T}{2} \\ R\cdot t-\frac{BW}{2}, & \frac{T}{2}<t<T \end{cases}, \quad f_2(t)=R\cdot t,$$

$s_D(t)$ is the first data signal, R is a frequency change rate of the second sensing signal or a frequency change rate of the third sensing signal, BW is a bandwidth of the third sensing signal, T is a signal period of $f_1(t)$, the preset threshold is $|f_1(t)-f_2(t)|$, $A_1$ is an amplitude of the first sensing signal, and $A_2$ is an amplitude of the second sensing signal.

6. The communication apparatus according to claim 5, wherein the operations comprising:

sending the second sensing signal by using a first antenna; and sending the third sensing signal by using a second antenna.

7. The communication apparatus according to claim 5, wherein the second communication apparatus is a first-type communication apparatus, and operations further comprising:

sending a first control signal, wherein the first control signal indicates a third communication apparatus not to receive a data signal in a first time period, and wherein the third communication apparatus is a second-type communication apparatus; and sending a second control signal to the second communication apparatus, wherein the second control signal indicates the second communication apparatus to receive the first data signal in the first time period.

8. A communication apparatus, wherein the first communication apparatus comprises:

at least one processor; and one or more memories coupled to the at least one processor and storing programming instructions for execution by the at least one processor to perform operations comprising:

receiving a first reflected signal and a second data signal, wherein the first reflected signal is a reflected signal corresponding to a fourth sensing signal, and the second data signal is a data signal sent by a second communication apparatus to the first communication apparatus;

determining a first signal, wherein the first signal is obtained based on the first reflected signal and the fourth sensing signal;

mixing the second data signal and a second signal to obtain a third data signal, wherein the third data signal occupies a first frequency band, the first signal occupies a second frequency band that does not overlap with the first frequency band to enable sensing without interference from the third data signal, and one of the first frequency band and the second frequency band comprises a baseband frequency;

performing, based on the first signal, sensing to obtain a sensing result; and demodulating the third data signal to obtain a demodulation result, wherein the second data signal is $A_3s_{data}(t)\sin f_Lt$, the second signal is $A_4\sin f_{LO}t$, the third data signal is $$s_{data}^{IF}(t)=[A_3s_{data}(t)\sin f_Lt]\otimes A_4\sin f_{LO}t=A_3A_4s_{data}(t)\sin(f_L-f_{LO})t,$$

and a frequency of the third data signal is $f_L-L_{LO}>\Delta f_{max}+B/2$, where $\Delta f_{max}$ is the maximum value of the second frequency difference, B is the bandwidth of the second data signal, $\otimes$ represents a frequency mixing operation, $A_3$ is an amplitude of the second data signal, and $A_4$ is an amplitude of the second signal.

9. The communication apparatus according to claim 8, wherein operations comprising:

correlating the first reflected signal with the fourth sensing signal to obtain the first signal, wherein the second frequency band occupied by the first signal comprises the baseband frequency.

10. The communication apparatus according to claim 8, wherein a center frequency of the first frequency band is greater than a first value, the first value is a sum of half a bandwidth of the second data signal and a maximum value of a second frequency difference, and the second frequency difference is a difference between a frequency of the fourth sensing signal and a frequency of the first reflected signal.

11. The first communication apparatus according to claim 8, to the operations comprising:

correlating the first reflected signal with the fourth sensing signal, to obtain a third signal; and mixing the third signal with a fourth signal to obtain the first signal, wherein a center frequency of the second frequency band occupied by the first signal is greater than half the bandwidth of the second data signal.

* * * * *